(12) United States Patent
Tanaka

(10) Patent No.: US 8,633,659 B2
(45) Date of Patent: Jan. 21, 2014

(54) LIGHTING DEVICE, HEADLAMP APPARATUS AND VEHICLE USING SAME

(75) Inventor: Toshifumi Tanaka, Toyonaka (JP)

(73) Assignee: Panasonic Corporation, Osaka (JP)

(*) Notice: Subject to any disclaimer, the term of this patent is extended or adjusted under 35 U.S.C. 154(b) by 197 days.

(21) Appl. No.: 13/092,348

(22) Filed: Apr. 22, 2011

(65) Prior Publication Data

US 2011/0260617 A1 Oct. 27, 2011

(30) Foreign Application Priority Data

Apr. 23, 2010 (JP) ................................ 2010-100259

(51) Int. Cl.
  *B60Q 1/02* (2006.01)
  *H05B 37/02* (2006.01)
  *H05B 33/08* (2006.01)
(52) U.S. Cl.
  USPC .............. 315/307; 315/82; 315/186; 315/219
(58) Field of Classification Search
  USPC ............ 315/307, 82, 185 R, 186, 193, 209 R, 315/210, 212, 219, 313
  See application file for complete search history.

(56) References Cited

U.S. PATENT DOCUMENTS

| | | | | |
|---|---|---|---|---|
| 7,208,882 B2 * | 4/2007 | Ishizuka | ........................ | 315/225 |
| 7,978,743 B2 | 7/2011 | Deppe et al. | | |
| 8,466,628 B2 * | 6/2013 | Shearer et al. | ............. | 315/209 R |
| 8,492,987 B2 * | 7/2013 | Nuhfer et al. | .................. | 315/246 |
| 8,492,988 B2 * | 7/2013 | Nuhfer et al. | .................. | 315/246 |
| 2007/0138975 A1 * | 6/2007 | Suganuma et al. | ........... | 315/291 |
| 2010/0091807 A1 | 4/2010 | Deppe et al. | | |
| 2011/0062870 A1 | 3/2011 | Kanbara | | |

FOREIGN PATENT DOCUMENTS

| CN | 101637065 | | 1/2010 |
|---|---|---|---|
| JP | 2004-039288 | | 2/2004 |
| JP | 2007-157423 | A | 6/2007 |
| JP | 2008-126958 | A | 6/2008 |
| JP | 2008-205036 | A | 9/2008 |
| JP | 2009-283401 | | 12/2009 |
| JP | 2009-284721 | A | 12/2009 |

OTHER PUBLICATIONS

Office Action dated Jul. 18, 2013 issued in the corresponding Chinese application No. 2011-10104663.4 (w/English translation thereof).
Office Action issued on Aug. 27, 2013 in corresponding Japanese application No. 2010-100259.

* cited by examiner

*Primary Examiner* — Daniel D Chang
(74) *Attorney, Agent, or Firm* — Bacon & Thomas, PLLC

(57) ABSTRACT

A lighting device includes: a power converting unit; a voltage measuring unit for measuring an output voltage from the power converting unit or a value equivalent to the output voltage; a current measuring unit for measuring an output current from the power converting unit or a value equivalent to the output current; and a control unit for controlling the power converting unit. When one of the output voltage and the output current of the power converting unit is changed by a specific magnitude per unit hour, the control unit determines that a change in a load status has occurred and controls the power converting unit by switching constant current control in which a measurement value of the current measuring unit is kept at a specific current designated value to constant voltage control in which a measurement value of the voltage measuring unit is kept at a specific voltage designated value.

20 Claims, 25 Drawing Sheets

LIGHTING DEVICE, HEADLAMP APPARATUS AND VEHICLE USING SAME

FIELD OF THE INVENTION

The present invention relates to a lighting device for supplying an output power required in loads, a headlamp apparatus and a vehicle using same.

BACKGROUND OF THE INVENTION

In recent years, the light emission efficiency of a semiconductor light source such as an LED (light-emitting diode) and an organic EL element has been improved, and illumination devices employing the semiconductor light sources have been put into practical use. The improvement in the light emission efficiency of the semiconductor light source has been recognized in the field of motor vehicles. Commercially available are motor vehicles that make use of semiconductor light sources in headlamps, taillights or brakelight.

In general, a lighting device for use in turning on a semiconductor light source is designed to turn on the semiconductor light sources through constant current control by which an electric current flowing to the semiconductor light sources is kept constant. This is to make uniform the light flux of the semiconductor light sources independent of a power supply voltage or a forward voltage of the semiconductor light sources.

There are proposed lighting devices, each having a load changeover function (a multiple-load control function) for changing over target loads (e.g., semiconductor light sources) to be powered such as taillights and a brakelights or crossing headlights and curvelights employed in motor vehicles. As one example, there is known a lighting device of a configuration in which semiconductor light sources are connected in series to an output terminal thereof. In this lighting device, a light output is reduced by short-circuiting some of the semiconductor light sources and keeping them turned off (see, e.g., Japanese Patent Application Publication No. 2004-39288, Paragraph 0045).

FIG. 18 shows one exemplary lighting device 1' having such a load changeover function. In the lighting device 1', loads 2 including a plurality of (nine, in FIG. 18) LEDs 21 and 22 serially-connected are turned on by applying a DC voltage thereto. The lighting device 1' includes a bypass switch (MOSFET) 4 connected in parallel to some of the LEDs (three LEDs 22 at the cathode side). The lighting device 1' can turn on the LEDs 21 and 22 with the bypass switch 4 switched off, and then turn on only the bypass switch such that only LEDs 21 are being kept on while the LEDs 22 are being short-circuited.

The lighting device 1' shown in FIG. 18 includes a current measuring circuit 7 for measuring an electric current flowing through the loads 2 as an output current. The lighting device 1' realizes constant current control by driving a power converting unit (DC-DC converter) 3 in such a manner that the average value of the output currents can be kept equal to a predetermined designated current value.

The lighting device 1' shown in FIG. 18 further includes an abnormality detecting unit 56 that stops the operation of the power converting unit 3 by detecting an abnormality from a measurement result of a current measuring circuit 7 or a voltage measuring circuit 6, which measures a voltage applied to the load 2 as an output voltage. The abnormality detecting unit 56 stops the operation of the power converting unit 3 by determining an abnormality when the output voltage becomes falling out of a specific normal range (e.g., from 10V to 40V).

(a) and (b) of FIG. 19 respectively show the changes in an output voltage and an output current in the lighting device 1' of the configuration described above. In FIGS. 19 through 23, the horizontal axis indicates the lapsed time. The vertical axis in (a) of each of FIGS. 19 to 23 indicates an output voltage while the vertical axis in (b) of each of FIGS. 19 to 23 indicates an output current.

When the LEDs 21 need to be turn on, the lighting device 1' drives the power converting unit 3 to increase an output voltage. An output current begins to flow when the output voltage reaches a forward voltage Vf1 of the LEDs 21. In this regard, the output current remains constant (the output current is assumed to be 0.7 A herein, but is not limited thereto) because the lighting device 1' performs the constant current control.

Further, if the LEDs 22 need to be turn on additionally in this state, the lighting device 1' performing the constant current control increases the output voltage in proportion to the added forward voltage Vf2 of the LEDs 22 so that the output current can be kept constant. This makes it possible to realize the constant current control with respect to the loads 2 and to change over the loads 2 to be powered while turning on the LEDs 21 and 22 with constant light flux regardless of the power supply voltage.

Focusing on the short period of time immediately after the loads 2 are changed over, the output voltage is overshot with the output current reduced sharply as shown in (a) and (b) of FIG. 20. These phenomena are caused by the time delay attributable to the fact that the output control of the lighting device 1' is a feedback control performed after detection of the output current. It is difficult to prevent occurrence of such phenomena.

Inasmuch as variations exist in the forward voltages Vf (=Vf1+Vf2) of the LEDs 21 and 22, the output voltage, when overshot, reaches an upper limit value Vmax of a normal range (at time t2) as shown in (a) of FIG. 21. It is sometimes the case that the abnormality detecting unit 56 stops the operation of the power converting unit 3. In other words, the output voltage does not exceed the upper limit value Vmax during the overshooting if the forward voltages Vf have typical values (as indicated by a dot line in (a) of FIG. 21), but may sometimes exceed the upper limit value Vmax during the overshooting if the forward voltages Vf grow higher than the typical value (as indicated by a solid line in (b) of FIG. 21).

In an effort to prevent the abnormal stop of the power converting unit 3, the upper limit value Vmax of the output voltage may be set higher than the forward voltages Vf. In this case, the output voltage is increased rapidly when the loads 2 suffer from open failure (disconnection), and may sometimes exceed the upper limit value Vmax as shown in (a) of FIG. 22. The abnormal increase in the output voltage is likely to apply stresses to the circuit parts of the lighting device 1', which may lead to failure of the lighting device 1'. If the abnormality detecting unit 56 is allowed to stop the operation of the power converting unit 3 in response to the instantaneous increase in the output voltage, there is a possibility that the abnormality detecting unit 56 may be erroneously operated due to a noise or other causes. Consequently, the output may become excessive because time required in determination gets longer. The failure of the lighting device 1' can be prevented by using high-voltage circuit parts, however, this may lead to an increase in the size cost of the lighting device 1'.

Since the LEDs 21 and 22 show greater variations in the forward voltages Vf thereof, it is difficult to balance the upper limit value Vmax of a normal range of the output voltage and the forward voltages Vf so that the abnormal stop of the power converting unit 3 and the abnormal increase in the output voltage should not occur. In particular, the variations in the forward voltages Vf become greater in proportion to the number of serially-connected LEDs.

Further, due to the combination of poor bonding, faulty connectors with vibration or other causes, it is sometimes the case that the loads 2 are momentarily (several milliseconds) disconnected from the lighting device 1' and then connected to the lighting device 1' (hereinafter referred to as "load chattering"). In this case, the loads are turned off momentarily and the output voltage is increased as shown in (a) of FIG. 23. When the loads 2 are reconnected, the output voltage thus increased is applied to the loads 2, such that an excessive current may flow through the LEDs 21 and 22, possibly causing failure of the LEDs 21 and 22. At this time, the electric current flowing through the LEDs 21 and 22 becomes greater in proportion to the difference between the upper limit value Vmax of the output voltage and the forward voltages Vf. Therefore, it is desirable to set the upper limit value Vmax as small as possible while avoiding the abnormal stop of the power converting unit 3. This also makes it difficult to balance the upper limit value Vmax of a normal range of the output voltage and the forward voltages Vf.

The abnormal increase in the output voltage occurring due to the open failure of the loads 2 or the load chattering becomes problematic even in a lighting device 1' having no load changeover function that does not employ the load changeover unit 55 and the bypass switch 4 shown in FIG. 18.

SUMMARY OF THE INVENTION

In view of the above, the present invention provides a lighting device capable of preventing an output voltage from abnormally increasing when the status of loads undergoes a change and a headlamp device and a motor vehicle using same.

In accordance with an aspect of the present invention, there is provided a lighting device including: a power converting unit for converting direct current power to output power required in loads; a voltage measuring unit for measuring an output voltage from the power converting unit or a value equivalent to the output voltage; a current measuring unit for measuring an output current from the power converting unit or a value equivalent to the output current; and a control unit for controlling the power converting unit.

When at least one of the output voltage and the output current of the power converting unit is changed by a specific magnitude per unit hour, the control unit determines that a change in a load status has occurred and controls the power converting unit by switching constant current control in which a measurement value of the current measuring unit is kept at a specific current designated value to constant voltage control in which a measurement value of the voltage measuring unit is kept at a specific voltage designated value.

The voltage designated value may be a value obtained by adding a specific additional value to the output voltage at a time before the control unit determines that the change in the load status has occurred.

The voltage designated value may be a measurement value of the voltage measuring unit at a time before the control unit determines that the change in the load status has occurred.

The voltage designated value may be a measurement value of the voltage measuring unit available after the control unit determines that the change in the load status has occurred.

The control unit preferably performs the constant voltage control of the power converting unit for a specific time and switches the constant voltage control to the constant current control after the specific time is lapsed.

The control unit may switch the constant voltage control to the constant current control when the measurement value of the current measuring unit is increased to a specific switching threshold value after the constant current control is switched to the constant voltage control.

The switching threshold value may be set smaller than the current designated value.

When the measurement value of the voltage measuring unit is changed by 15V or more within 300 µs, the control unit preferably determines that the change in the load status has occurred and switches the constant current control to the constant voltage control.

When the measurement value of the current measuring unit is changed by 0.12 A or more within 300 µs, the control unit preferably determines that the change in the load status has occurred and switches the constant current control to the constant voltage control.

Preferably, the control unit switches the power converting unit in a boundary conduction mode and determines the change in the load status depending on the change of a switching frequency of the power converting unit.

The control unit preferably stops the operation of the power converting unit for a time period during which the measurement value of the voltage measuring unit is kept greater than the voltage designated value under the constant voltage control.

A power consumption circuit is connected between output terminals of the power converting unit and when the constant current control is switched to the constant voltage control, the power consumption circuit may partially consume an output of the power converting unit.

The control unit may switch the power converting unit in a boundary conduction mode and prolongs the switching-off time of the power converting unit when the constant current control is switched to the constant voltage control.

The control unit may have an operation stop function by which the operation of the power converting unit is stopped when the constant voltage control lasts for a specific stop time or more after the constant current control is switched to the constant voltage control.

The loads may include a plurality of serially-connected semiconductor light sources and the control unit further includes a bypass unit for short-circuiting the semiconductor light sources forming some of the loads and a load changeover unit for changing over the bypass unit between a connection state and a disconnection state.

The voltage designated value may be a value obtained by adding a specific additional value to the measurement value of the voltage measuring unit available before the control unit determines that the change in the load status has occurred, the additional value being equal to or greater than a forward voltage of the semiconductor light sources short-circuited by the bypass unit.

In accordance with another aspect of the present invention there is provided a headlight device including the above-described lighting device.

The loads may include at least two of crossing headlights, running headlights, width indicator lamps, daytime running lights, winker lamps and curve lights.

In accordance with still another aspect of the present invention there is provided a motor vehicle equipped with the lighting device or the headlight device described above.

The present invention has an advantage in that it is possible to prevent an output voltage from abnormally increasing when the status of loads undergoes a change.

BRIEF DESCRIPTION OF THE DRAWINGS

The objects and features of the present invention will become apparent from the following description of embodiments, given in conjunction with the accompanying drawings, in which.

DETAILED DESCRIPTION OF THE PREFERRED EMBODIMENTS

Hereinafter, embodiments of the present invention will be described with reference to the accompanying drawings which form a part hereof.

First Embodiment

Figure 18:
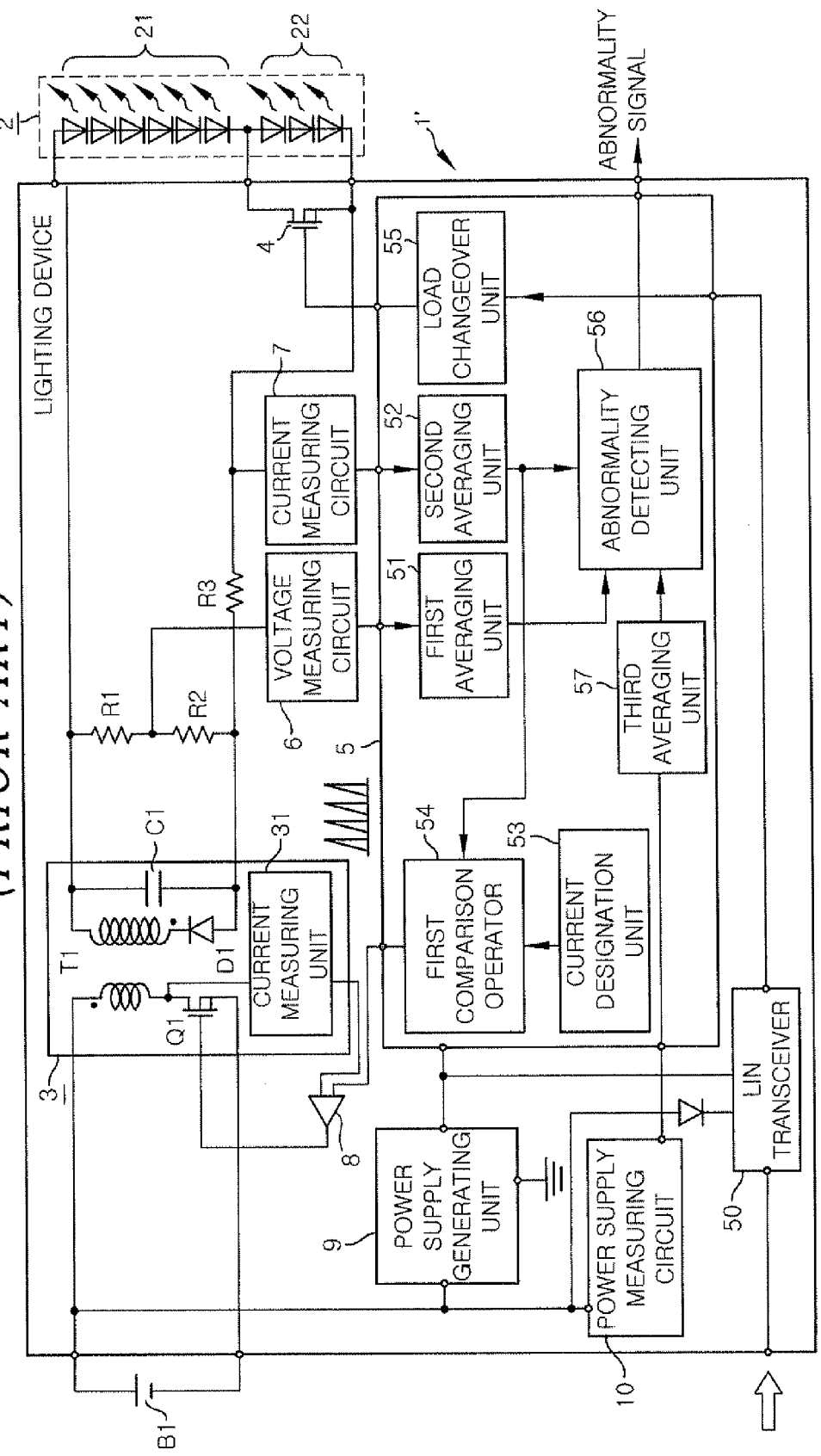
FIG. 18 is a schematic circuit diagram showing a configuration of a conventional lighting device.
Figure 19:
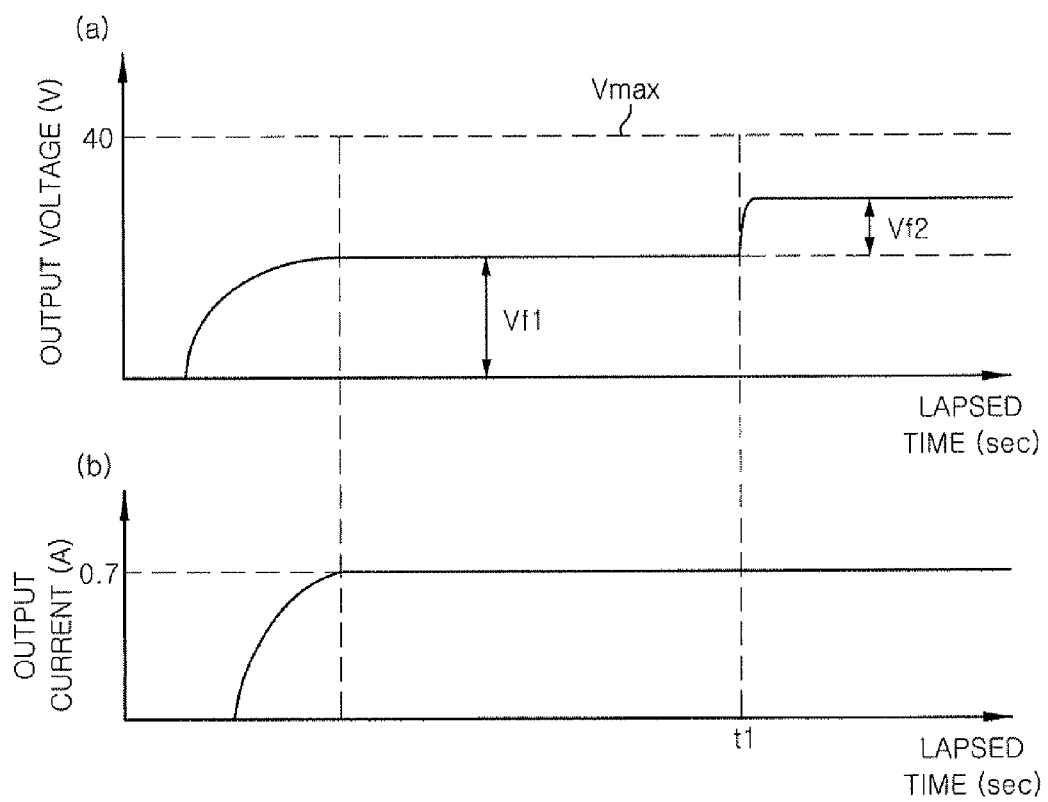
FIG. 19 illustrates graphs for explaining an operation of a conventional lighting device.
Figure 20:
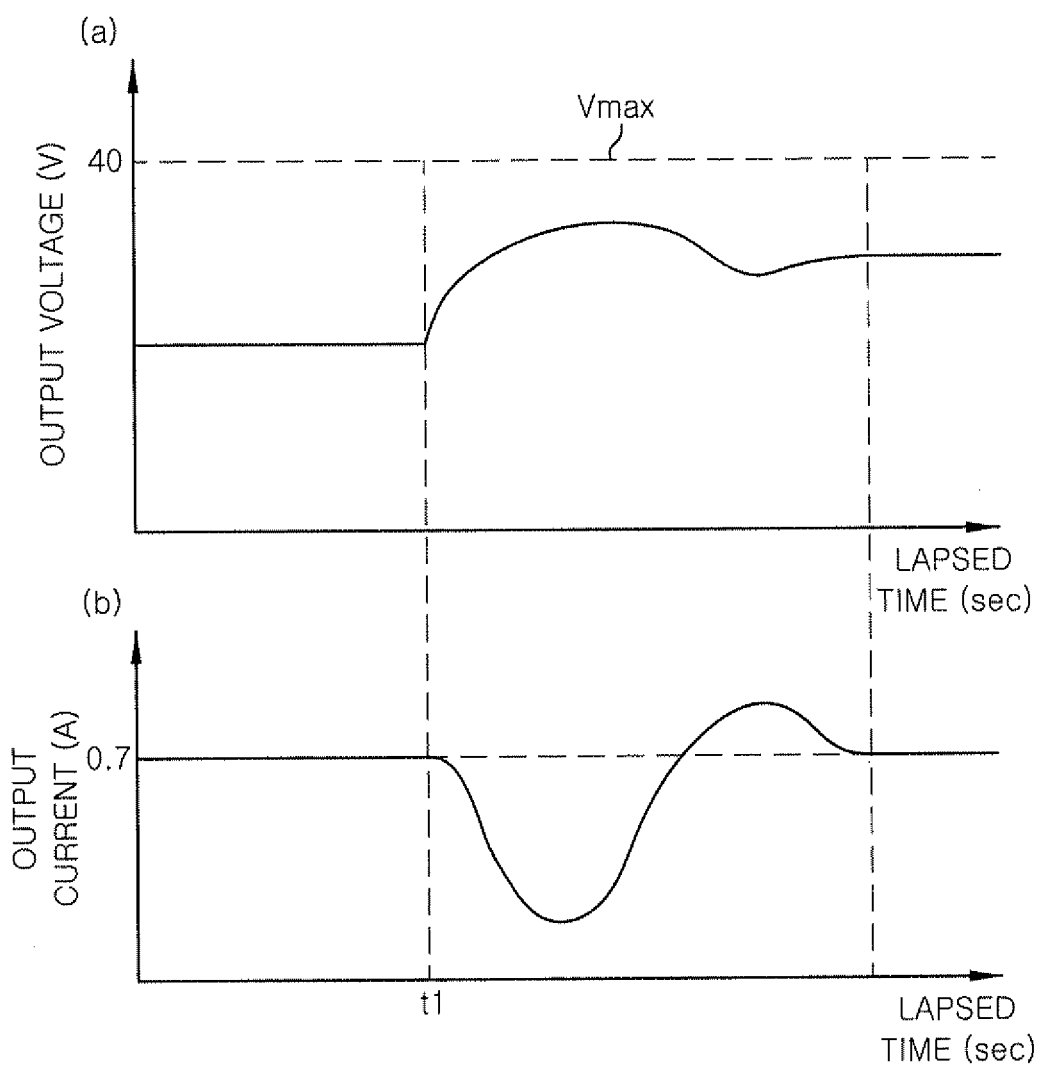
FIG. 20 depicts graphs for explaining an operation of the conventional lighting device.
Figure 21:
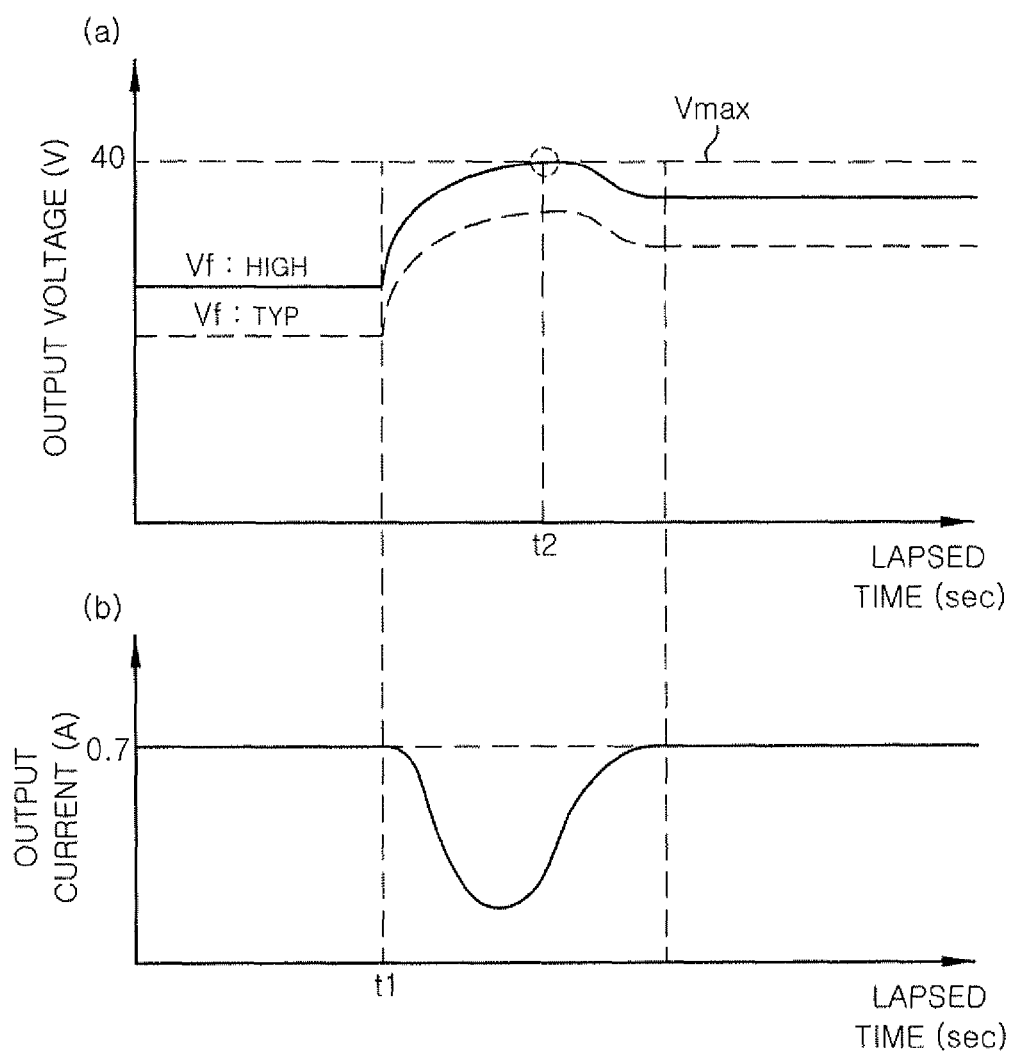
FIG. 21 shows graphs for explaining an operation of the conventional lighting device.
Figure 22:
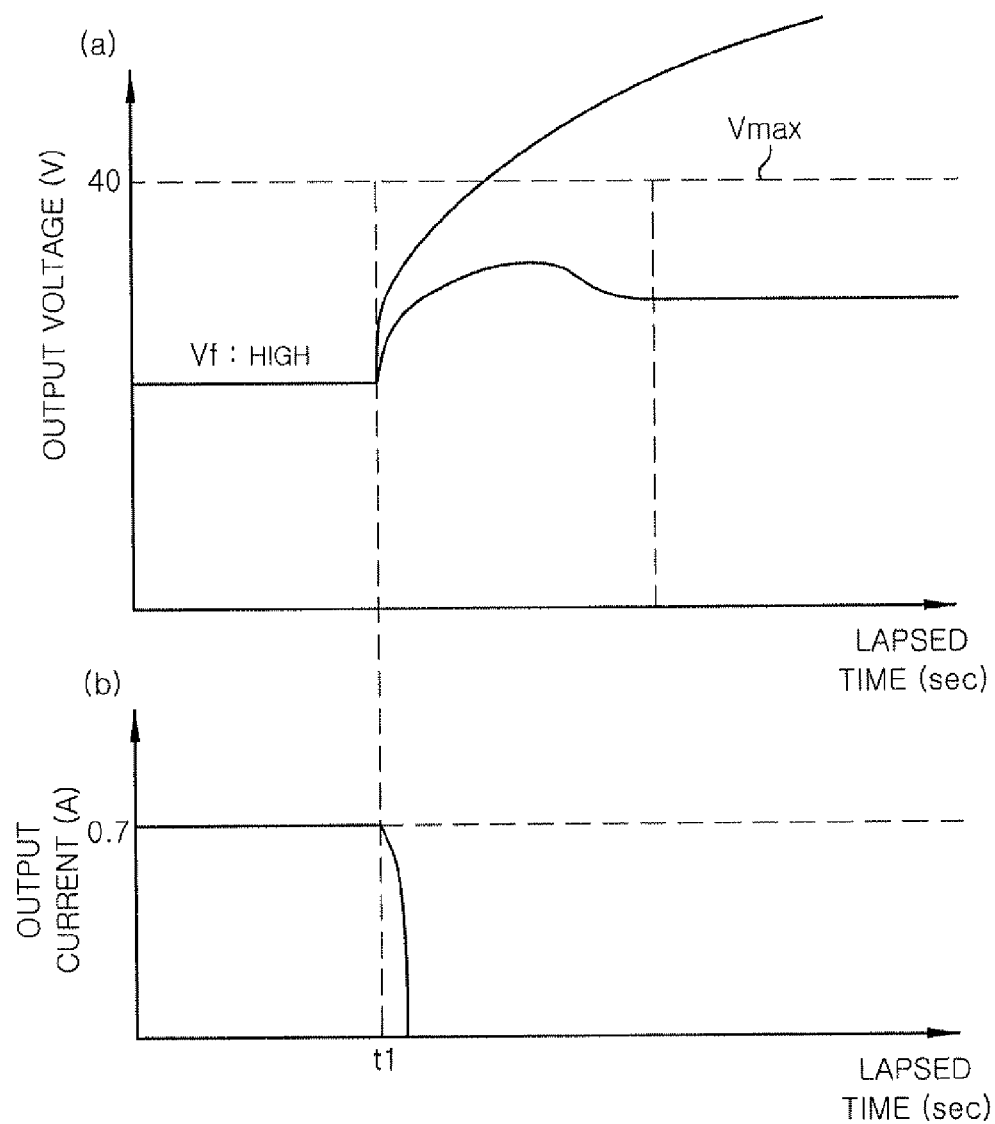
FIG. 22 illustrates graphs for explaining the operation of the conventional lighting device.
Figure 23:
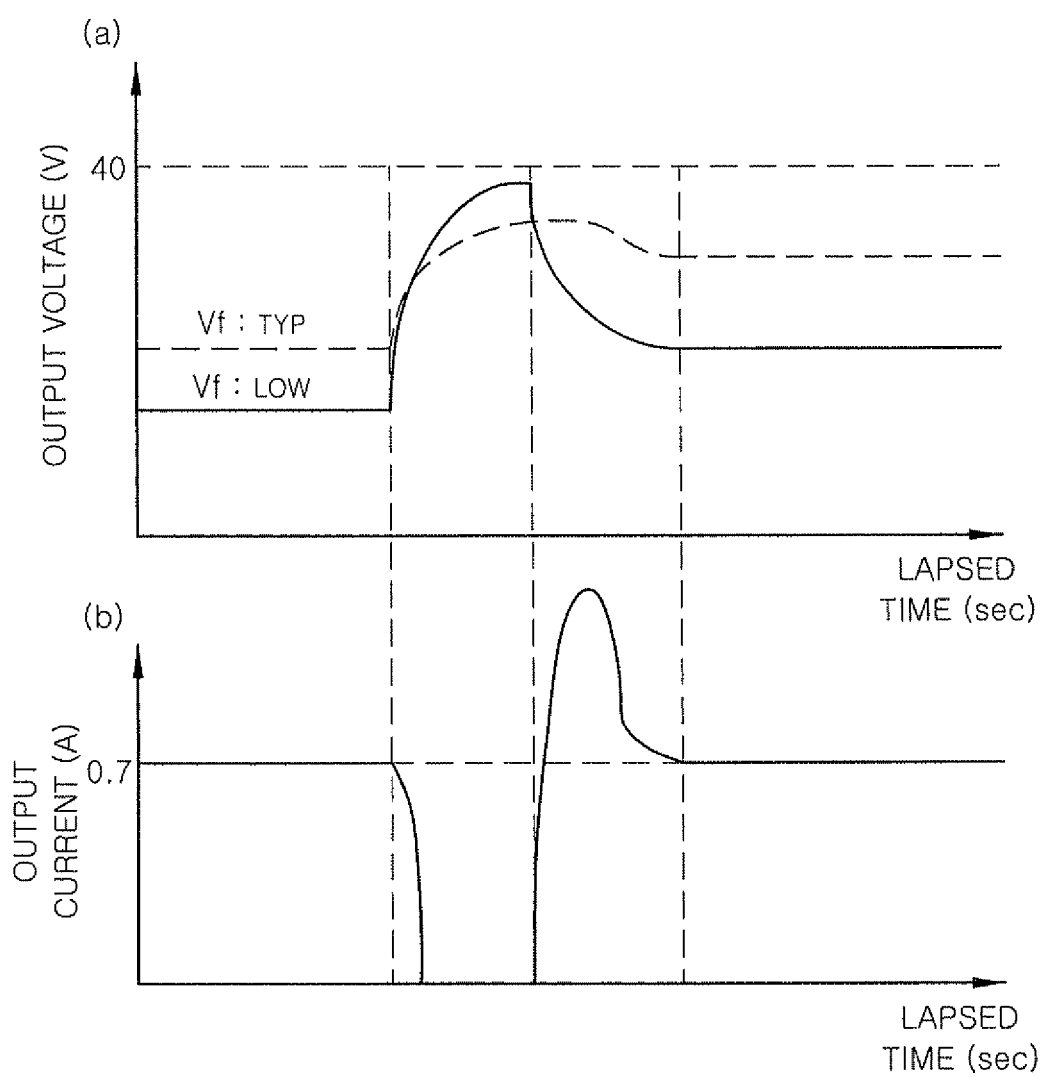
FIG. 23 depicts graphs for explaining an operation of the conventional lighting device.

A lighting device of the present embodiment shares the basic configurations with the conventional lighting device 1' shown in FIG. 18. The same configurations and functions as those of the conventional lighting device 1' shown in FIG. 18 will be described first.

Figure 1:
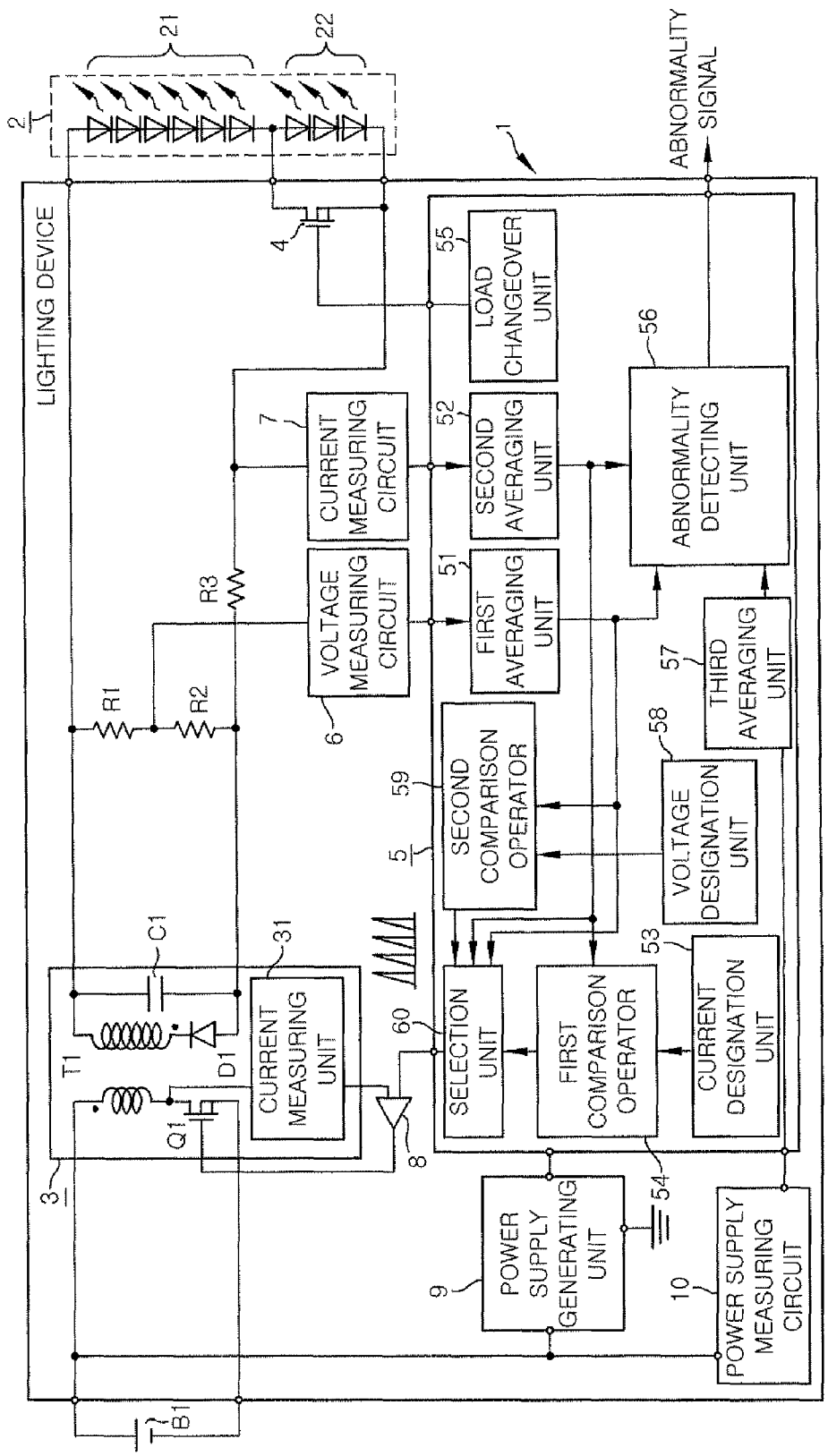
FIG. 1 is a schematic circuit diagram showing the configuration of a lighting device in accordance with a first embodiment.

Referring to FIG. 1, the lighting device 1 in accordance with the present embodiment is designed to turn on loads 2 including a plurality of (e.g., nine, in the present embodiment) LEDs 21 and 22 serially-connected by applying a DC voltage to the loads 2. In the present embodiment, it is assumed that the lighting device 1 is installed in a motor vehicle. Among the LEDs 21 and 22 forming the loads 2, the six anode-side LEDs 21 are used as crossing headlights (also called low-beam headlamps) and the three cathode-side LEDs 22 are used as curvelights. The curve lamps referred to herein are so-called cornering lights. The curve lamps are auxiliary lights that turn on when a motor vehicle runs along a curved road with its headlamps turned on and illuminate the direction of movement to enhance visibility.

The lighting device 1 includes a power converting unit 3 including of a DC-DC converter. The power converting unit 3 is directly connected with a battery B1, so that a DC voltage applied from the battery B1 is step-up (boost) or step-down (buck) to a DC voltage for turning on the loads 2. Depending on the on and off state of a headlamp switch 120 (see FIG. 6), the lighting device 1 turns the loads 2 on by applying the DC voltage, i.e., the output voltage of the power converting unit 3, to the loads 2.

The lighting device 1 further includes a bypass switch 4 connected in parallel to the LEDs 22. The lighting device normally turns on only the LEDs 21 by turning on the bypass switch 4. All the LEDs 21 and 22 can be turned on by turning off the bypass switch 4. The bypass switch 4 includes a MOSFET and is turned on and off upon receiving a switch signal from a microcomputer 5 to be described later.

The lighting device 1 normally turns on the loads 2 through constant current control by which an electric current flowing to the loads 2 is kept constant. A microcomputer 5 as a control unit is used in the constant current control. The lighting device 1 includes a voltage measuring circuit 6 for measuring the voltage applied to the loads 2 as an output voltage and a current measuring circuit 7 for measuring the electric current flowing through the loads 2 as an output current. The voltage measuring circuit measures the output voltage from a voltage divided by resistors R1 and R2 connected in series between the output terminals of the power converting unit 3. The current measuring circuit 7 measures the output current from a voltage across a resistor R3 provided between the power converting unit 3 and the loads 2.

The microcomputer 5 as the control unit has first and second averaging units 51 and 52 for respectively averaging the output voltages measured by the voltage measuring circuit 6 and the output currents measured by the current measuring circuit 7. The microcomputer 5 causes a current designation unit 53 to call a current designated value stored in advance and then causes a first comparison operator 54 to compare the current designated value with the average value of the output currents and to output a control value. The microcomputer 5 controls the power converting unit 3 such that the average value of the output currents is set to be equal to the current designated value. This makes it possible for the lighting device 1 to perform constant current control by which the output current is kept equal to the current designated value.

The microcomputer 5 also has a load changeover unit 55 for, responsive to a changeover signal, turning on or off the bypass switch 4 to change the state in which only the LEDs 21 are turned on and the state in which all the LEDs 21 and 22 are turned on. The lighting device 1 of the present embodiment acquires an instruction on the on-timing of the LEDs 22 through LIN (Local Interconnect Network) communications by using an LIN transceiver 50. The LIN transceiver 50 is shown in FIG. 18 and is omitted in FIG. 1.

The load changeover unit 55 normally turns on the bypass switch 4 but, upon receiving an instruction to turn on the LEDs 22 through LIN communications (when a motor vehicle travels along a curved road), turns off the bypass switch 4 to thereby turn on the LEDs 22 in addition to the LEDs 21. While the LIN communications are described herein by way of example, the necessity of turning on the LEDs 21 and 22 may be determined through CAN (Controller Area Network) communications or depending on the measurement result of a vehicle situation measured by an angular velocity sensor or other sensors.

More specifically, the power converting unit 3 including a flyback circuit and includes a transformer T1, switching element Q1 connected in series to the primary coil of the transformer T1 and a capacitor C1 connected to the secondary coil of the transformer T1 through a diode D1. The battery B1 is connected to the serial circuit of the primary coil of the transformer T1 and the switching element Q1. As the switching element Q1 is turned on or off, an electric current is allowed to flow from the secondary coil of the transformer T1 to the capacitor C1 through the diode D1, thereby generating a DC voltage across the opposite ends of the capacitor C1. The loads 2 are connected to opposite ends of the capacitor C1 through the resistor R3.

The power converting unit 3 includes a current measuring unit 31 for measuring a primary side current flowing through the primary coil of the transformer T1. A comparator 8 compares the control value with an output value of the current measuring unit 31, the control value being decided by the first comparison operator 54 to set the average value of the output currents to be equal to the current designated value. Therefore, a driving signal for turning on and off the switching element Q1 is generated.

The current measuring unit 31 outputs a triangular wave (shown in FIG. 1) by using the drain voltage of the switching element Q1. The comparator 8 outputs the driving signal to turn off the switching element Q1 when the triangular wave outputted by the current measuring unit 31 becomes equal to the control value. The current measuring unit 31 will not be described in detail herein but may be, e.g., of the type generating a triangular wave at a specified frequency.

The power supply for operating the microcomputer 5 is generated in a power supply generating unit 9 which is operated by using the battery B1 as its power supply for operating.

In the lighting device 1, the microcomputer 5 includes an abnormality detecting unit 56 for detecting an abnormality of the loads 2 from the measurement results of the voltage measuring circuit 6 and the current measuring circuit 7, stopping the operation of the power converting unit 3 and outputting an abnormality signal. For example, when the output voltage falls out of a specified normal range (10V to 40V in the present embodiment), the abnormality detecting unit 56 determines occurrence of the abnormality, stops the operation of the power converting unit 3 and outputs the abnormality signal. The abnormality signal is a signal for notifying the load abnormality to the outside of the lighting device 1 and may be used in, e.g., turning on a warning light provided in a motor vehicle.

The lighting device 1 includes a power supply measuring circuit 10 for measuring the electric power inputted from the battery B1. The values measured in the power supply measuring circuit 10 are averaged by a third averaging unit 57 and an average value therefrom is inputted to the abnormality detecting unit 56. The abnormality detecting unit 56 detects a power supply abnormality from the measurement result of the power supply measuring circuit 10.

Figure 2A:
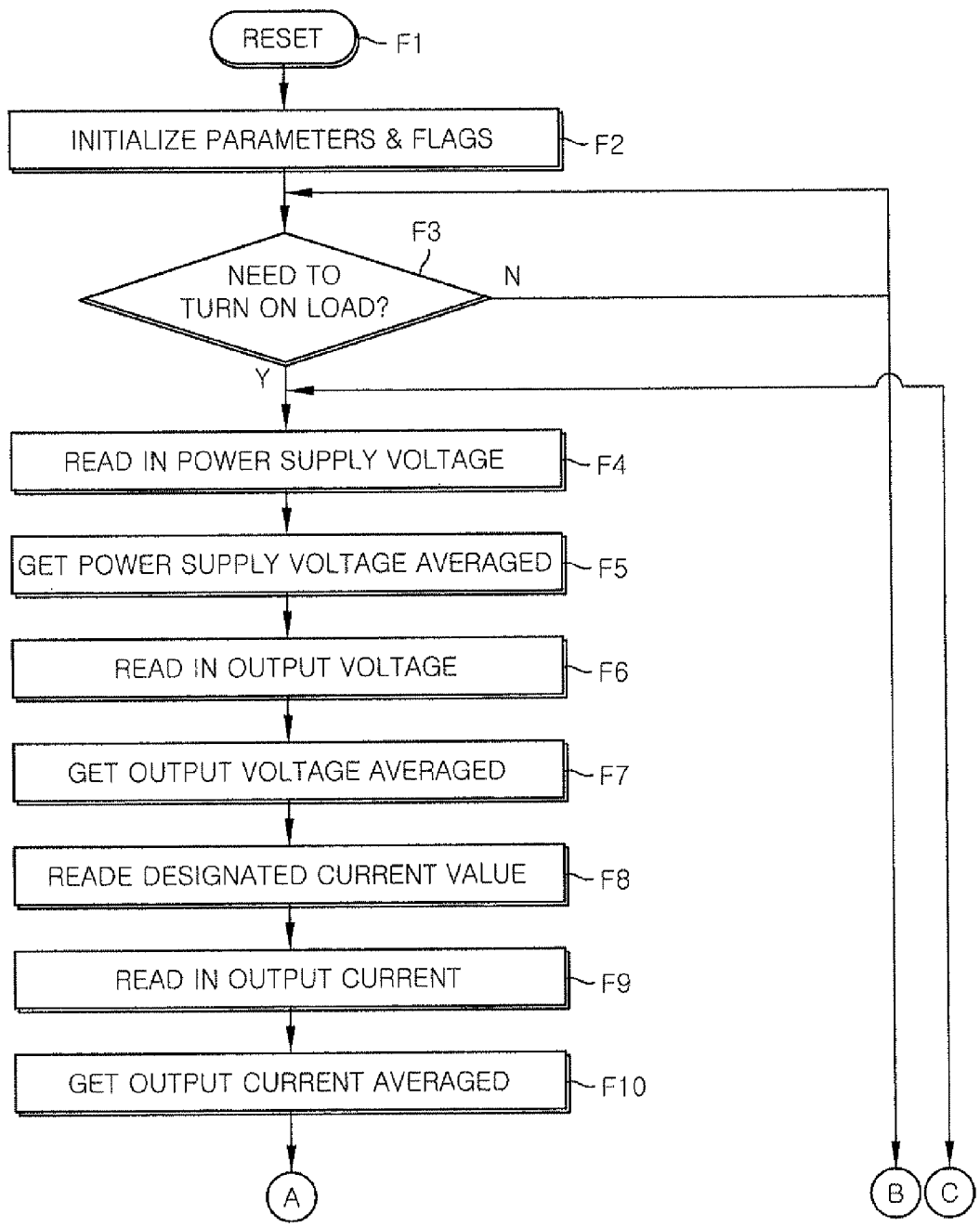
FIGS. 2A and 2B show a flowchart illustrating the operation of a microcomputer employed in the lighting device.
Figure 2B:
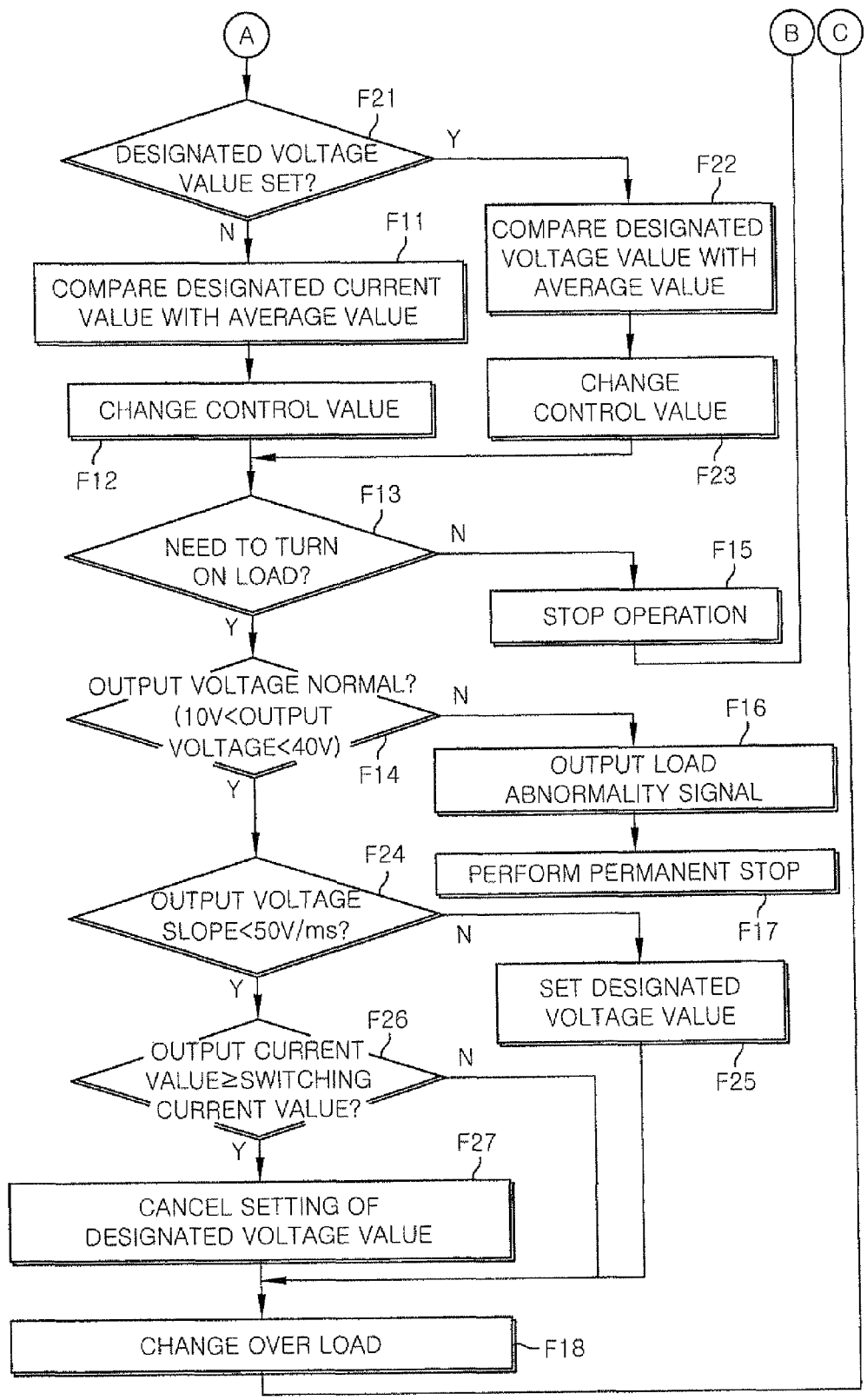

Hereinafter, operations of the lighting device 1 of the present embodiment same as the operations of the conventional lighting device 1' shown in FIG. 18 will be briefly described with reference to FIG. 2. FIG. 2 illustrates a control flow of the microcomputer 5. The lighting device 1 realizes the constant current control of the loads 2 in steps F4 to F12, executes the determination of an abnormality of the power supply and the loads 2 in steps F13 to F17 and performs the changeover of the loads 2 in step F18. The operations of steps F21 through F27 in FIG. 2 will be described later.

More specifically, when the power is on and the reset signal is inputted (step F1), the microcomputer 5 performs the initialization of parameters and flags (step F2). Then, the microcomputer 5 determines whether there is a need to turn on the loads 2 (step F3) based on the state of the headlamp switch 120, If yes in step F3, the flow proceeds to processes for turning on the loads 2.

In order to turn on the loads 2, the power supply measuring circuit 10 of the microcomputer 5 reads out the power supply voltages through A/D conversion (step F4) and the third averaging unit 57 performs averaging of the power supply voltages by combining the previous values with the read-out value (step F5). As one example, the microcomputer 5 stores three latest detection values (which are renewed every read-out time) and, upon reading out the next detection value, performs averaging by dividing the sum of the next detection value and the three latest detection values by four.

Next, the first averaging unit 51 of the microcomputer 5 reads out the output voltages through A/D conversion (step F6) and performs averaging of the output voltages by combining the previous values with the read-out value (step F7). Then, current designation unit 53 of the microcomputer 5 reads out the current designated value stored in a ROM (not shown) thereof (step F8) and reads out the output currents through A/D conversion (step F9). The second averaging unit 52 performs averaging of the output currents by combining the previous current values with the read-out current value (step F10). Thereafter, the comparison operator 54 of the microcomputer 5 compares the current designated value with the average value of the output currents (step F11) and decides a control value in accordance with the comparison result (step F12).

Subsequently, the microcomputer 5 determines whether or not there is a need to turn on the loads 2 depending on the on/off state of the headlamp switch 120 (step F13). If no in step F13, the microcomputer 5 stops the operation of the power converting unit 3, clears the data (step F15) and returns to the step of determining the turn-on necessity of the loads 2 (step F3). If there is a need to turn on the loads 2, the abnormality detecting unit 56 of the microcomputer 5 determines whether the output voltages are normal depending on whether the output voltages fall within a specified normal range (step F14). When the output voltages are within the normal range, abnormality detecting unit 56 determines the output voltages to be normal regardless of the status of the loads 2.

If the output voltages are determined to be abnormal, the abnormality detecting unit 56 outputs a abnormality signal (step F16) to stop the operation of the power converting unit 3, clears the data and performs permanent stop processing (step F17) to carry out infinite loop processing. Meanwhile, the load changeover unit 55 of the microcomputer 5 determines from the result of the LIN communications whether or not to change over the loads 2 (i.e., the LEDs 22) and outputs a load changeover signal (step F18).

The configurations and functions of the lighting device 1 set forth above are the same as those of the conventional lighting device 1' shown in FIG. 18.

Unlike the conventional one, the lighting device 1 in accordance with the present embodiment does not perform the constant, current control at all times but is designed to switch the constant current control to constant voltage control upon detecting a sudden change of the load status. In this regard, the lighting device 1 determines that the load status to have been suddenly changed when the output voltages are changed with a variation rate of 50 V/ms or more. The lighting device 1 is designed to come back to the constant current control when, after switched to the constant voltage control, the output currents become equal to or greater than a specified switching current value (switching threshold value). The switching current value is set smaller than the target value (the current designated value) during the constant current control (The switching current value is assumed to be, e.g., 0.4 A in the present embodiment). Further, the variation rate of the output voltages is not limited to 50 V/ms, but may have various values, e.g., 40 V/ms, 60 V/ms, 70 V/ms or the like. Furthermore, the switching current value is not limited to 0.4 A but may have various values.

The lighting device 1 in accordance with the present embodiment makes it possible to switch between the constant current control and the constant voltage control and, therefore, differs from the conventional lighting device 1' shown in FIG. 18 in the following aspects. More specifically, the lighting device 1 of the present embodiment differs from the conventional lighting device 1' shown in FIG. 18 in that a voltage designation unit 58, a second comparison operator 59 and a selection unit 60 are added to the microcomputer 5. In the microcomputer 5, the voltage designation unit 58 calls a voltage designated value stored in advance and the second comparison operator 59 compares the voltage designated value with the average value of the output voltages and decides a control value so that the voltage designated value and the average value of the output voltages can be equal to each other.

In this regard, the current designated value is the target value of the output voltages for the constant voltage control and is set greater than the output voltage value increased when changing over the loads 2. In other words, the voltage designated value is set greater than the forward voltage Vf (=Vf1+Vf2) of the LEDs 21 and 22. Herein, when there exist variations in the forward voltage Vf of the LEDs 21 and 22, the voltage designated value is set greater than the maximum value of the forward voltage Vf of the LEDs 21 and 22 that reflects the variations.

In the present embodiment, the value obtained by adding a specific additional value to the output voltage available just before it is determined by the microcomputer 5 that there has been a change in the load status is used as the voltage designated value. The additional value is set equal to or greater than the forward voltage Vf2 of the LEDs 22 added by the changeover of the loads 2.

The selection unit 60 selects either the control value outputted from the first comparison operator 54 or the control value outputted from the second comparison operator 59, and outputs the selected control value to the comparator 8. In this regard, the selection unit 60 determines the change in the load status from the output voltages and the output currents, thereby determining which control value is to be selected. In other words, the selection unit 60 selects the control value outputted from the second comparison operator 59 when the output voltages are changed with a variation rate of 50V/ms or more, but selects the control value outputted from the first comparison operator 54 when the output currents become equal to or greater than the switching current value (0.4 A).

The lighting device 1 in accordance with the present embodiment also differs from the conventional lighting device 1' shown in FIG. 18 in that steps F21 through F27 illustrated in FIG. 2 are added to the operations of the microcomputer 5. More specifically, after the processing in step F10, the microcomputer 5 determines whether the voltage designated value is set (step F21). Depending on the result of this determination, the microcomputer 5 decides which steps F11 and F12 or steps F22 and F23 are to be performed. If the voltage designated value is set, the microcomputer 5 compares the voltage designated value with the average value of the output voltages (step F22) and decides a control value based on the comparison result (step F23), thereby performing the constant voltage control. In the manner set forth above, the microcomputer 5 switches the constant voltage control and the constant current control depending on whether the voltage designated value is set or not.

The setting of the voltage designated value is performed in the processing of steps F24 through F27 between the processing of step F14 and the processing of step F18. More specifically, if the output voltages are determined to be normal (if yes in step F14), the microcomputer 5 determines whether there exists a sudden change in the output voltages (a change in the output voltages with a variation rate of 50V/ms or more) (step F24). If a sudden change exists (if yes in step F24), the microcomputer 5 sets a voltage designated value (step F25). If there exists no sudden change (if yes in step F24), the microcomputer 5 determines whether the output current value is 0.4 A or more (step F26). If the output current value is determined to be 0.4 A or more, the microcomputer 5 cancels the setting of the voltage designated value (step F27). Since the variation rate of the output voltages grows smaller during the voltage control, the microcomputer 5 proceeds to the processing of steps F26.

By virtue of the operations of the microcomputer 5 described above, the lighting device 1 in accordance with the present embodiment realizes the switching control of the constant current control and the constant voltage control.

Figure 3:
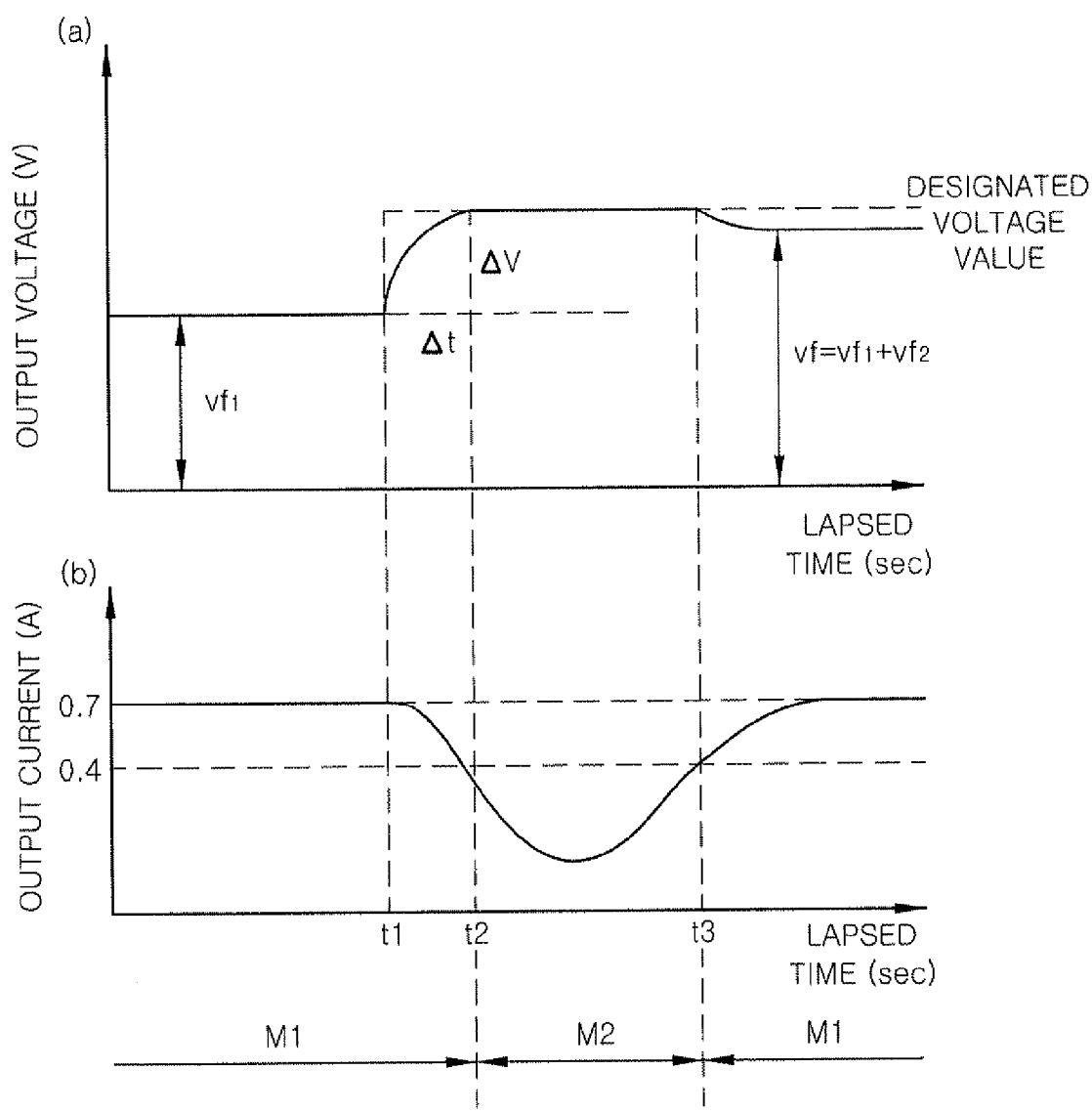
FIG. 3 show graphs for explaining the operation of the lighting device.
Figure 4:
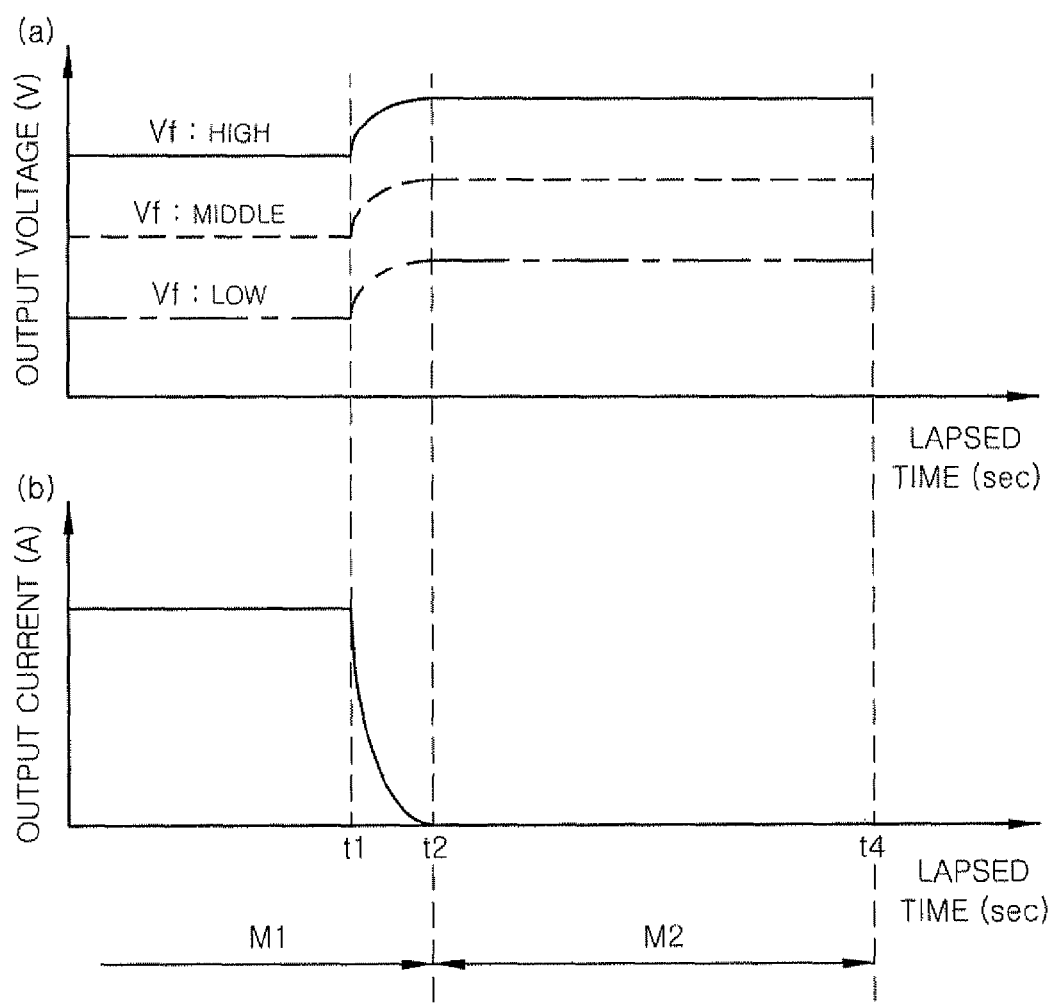
FIG. 4 illustrates graphs for explaining the operation of the lighting device.

(a) and (b) in FIG. 3 show the changes in the output voltages and the output currents in the lighting device 1 of the present embodiment when the loads 2 are changed over by the load changeover unit 55. In (a) and (b) of FIG. 3 and those of FIG. 4, the horizontal axis indicates the lapsed time. The vertical axis in (a) of FIG. 3 and that of FIG. 4 indicate the output voltages while the vertical axis in (b) of FIG. 3 and that of FIG. 4 indicate the output currents.

If the bypass switch 4 is turned off by the load changeover unit 55 and the LEDs 22 are turned on at time t1, the output voltages are increased and the output currents are decreased. At time t2, the lighting device 1 detects that the output voltages are increased with a variation rate of 50V/ms or more (i.e., $\Delta V/\Delta t \geq 50$ V/ms) and switches the constant current control (the period "M1" in (b) of FIG. 3) to the constant voltage control (the period "M2" in (b) of FIG. 3). In the conventional lighting device that performs the constant current control at all times as described in the section of "Background of the Invention", the output currents are decreased. Therefore, the conventional lighting device is operated to further increase the output currents, consequently accelerating the increase of the output voltages. In contrast, the lighting device 1 of the present embodiment switches the constant current control to the constant voltage control, which makes it possible to prevent the increase of the output voltages.

Since the voltage designated value as the target value of the output voltages during the constant voltage control is set greater than the forward voltage Vf2 of the LEDs 22 whose output voltages are to be increased by the load changeover, the output currents decreased first begins to increase in a reliable manner. Thus, when the output currents reach the switching current value (0.4 A) at time t3 and the lighting device 1 switches the constant voltage control to the constant current control (the period "M1" in (b) of FIG. 3) once again. In a case that the lighting device 1 continues to perform the constant voltage control with the voltage designated value greater than the forward voltage Vf (=Vf1+Vf2) of the loads 2, a high current flows through the LEDs 21 and 22. In the present embodiment, however, the constant voltage control is switched to the constant current control if the output currents reach the switching current value. This helps optimize the period during which the constant voltage control is performed.

By setting the switching current value smaller than the target value of the output currents during the constant current control (the current designated value), it is possible for the lighting device 1 to readily realize the switching from the constant voltage control for the suppression of overshooting to the constant current control.

With the lighting device 1 of the present embodiment described above, it is possible to prevent the excessive increase in the output voltages and to prevent occurrence of an open failure (disconnection) of the loads 2 and stoppage of the operation of the loads 2 due to error recognition even if there exist variations in the forward voltage Vf of the loads 2. It is also possible to prevent the circuit breakage because the increase of the output voltages can be prevented when the open failure of the loads 2 occurs.

The output current value becomes zero when the open failure of the loads 2 occurs. Therefore, the lighting device 1 continues to perform the constant voltage control without switching the constant voltage control to the constant current control. The lighting device 1 may have a stopping function by which the operation of the power converting unit 3 is stopped when the constant voltage control lasts for a specific stop time. Therefore, even when the open failure of the loads 2 occurs (at time t1), the lighting device 1 stops the operation of the power converting unit 3 when the constant voltage control lasts for the stop time (time t2 to t4) as shown in (a) and (b) of FIG. 4. This makes it possible to realize error-free abnormal operation stop when the open failure of the loads 2 occurs.

It is possible for the lighting device 1 to prevent the increase of the output voltages even when there occurs the load chattering in which the loads 2 are momentarily (several milliseconds) disconnected from the lighting device 1 and then reconnected to the lighting device 1. This makes it possible to prevent a high current from flowing through the loads 2 at the time of reconnection, thereby lessening the burden borne by the lighting device 1 or the LEDs 21 and 22.

While the highly-functional lighting device 1 having a function of changing over the loads 2 has been illustrated in the present embodiment, the function of switching between the constant current control and the constant voltage control is also useful in the lighting device with no function of changing over the loads 2. In other words, even if the load changeover unit 55 and the bypass switch 4 are omitted from the configuration shown in FIG. 1, the lighting device can get the same advantageous effects as those of the above-described lighting device 1 when the open failure of the loads 2 or the load chattering occurs.

While one bypass switch 4 for changing over the loads 2 is employed in the present embodiment, an additional bypass switch may be provided in a parallel relationship with the LEDs 21 so that the LEDs 21 and 22 can be independently turned on. In this case, it is possible to provide the same advantageous effects as those of the above-described embodiment. Even if the LEDs 21 and 22 are connected in parallel, the same advantageous effects as those of the above-described embodiment can be expected.

When the change rate of the output voltages becomes 50V/ms or more, the lighting device 1 in accordance with the present embodiment determines occurrence of a sudden change in the status of the loads 2 and switches the constant current control to the constant voltage control. However, the present invention is not limited thereto. The occurrence of a sudden change in the status of the loads 2 may be determined when the output voltages are changed by a specific magnitude or more within a unit time. In the determination using the change rate of the output voltages, the lighting device 1 switches the constant current control to the constant voltage control when the output voltages are changed 2.5V within, e.g., 50 µs. The output voltages may be possibly changed about 2.5V due to a noise or other causes.

In view of this, the lighting device 1 may be designed to determine the occurrence of a sudden change in the status of the loads 2 and switch the constant current control to the constant voltage control when the output voltages are changed by a specific magnitude (e.g., 15V) or more within a prescribed time period (e.g., 300 µs). This makes it possible to realize noise-resistant control.

Conditions for determining occurrence of a sudden change in the status of the loads 2 to have the lighting device 1 to switch the constant current control to the constant voltage control are as follows. In this regard, it is assumed that, in the lighting device 1, the turn ratio of the transformer T1 is 1:4, the inductance value of the primary coil being several µH, the driving frequency of the power converting unit 3 being several hundred kHz, the power supply voltage being 6V to 20V, the output voltages being 10V to 40V and the rated output being several ten W.

In the lighting device 1, if the loads 2 are turned on by changing the power supply voltage and the output voltages and if the output power is increased rapidly, the minimum value of the increasing variation rate of the output voltages is 56V/ms (The output voltages are increased substantially in the form of a linear function). Upon opening a circuit load having an output of several ten W, the output voltages are increased with a variation rate of 50V/ms. Since a high current may flow if the output voltages are increased, there is a need to suppress the increase in the output voltages. The ripple of the output voltages when the LEDs are turned on with no flickering is approximately 1.3V.

In view of this, the output voltages need to be increased more than 1.3V. Taking a noise into account, it is desirable to perform the operation stop when the output voltages are changed by 15V or more which is more than ten times as great as the ripple of the output currents, 1.3V. In this case, the time is calculated by using a variation rate of 50V/ms and the output reduction control is performed when the output voltages are changed more than 15V for 300 µs.

While the loads 2 are turned on by applying a positive voltage to the loads 2 as opposed to the ground in the lighting device 1 of the present embodiment, it is equally possible to turn on the loads 2 by reversing the anode and the cathode of the LEDs as the loads 2 and applying a negative voltage to the loads 2. In this case, the positive and negative reversal also applies to the conditions for determining occurrence of a sudden change in the status of the loads 2 to switch the constant current control to the constant voltage control.

Figure 5:
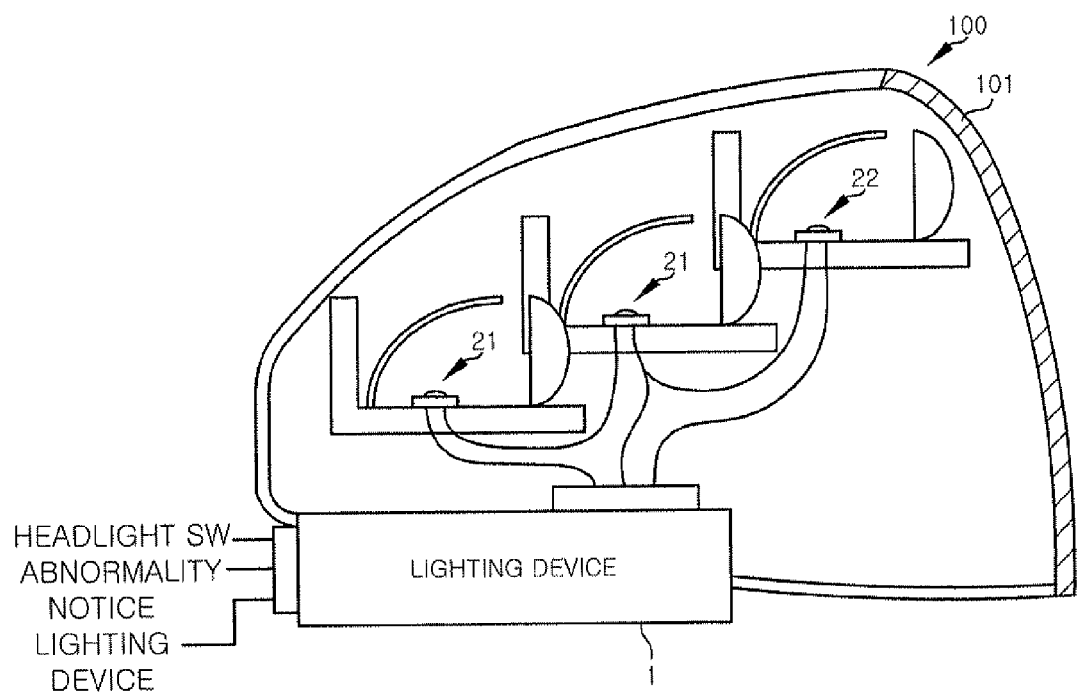
FIG. 5 is a schematic view showing a headlamp device using the lighting device.
Figure 6:
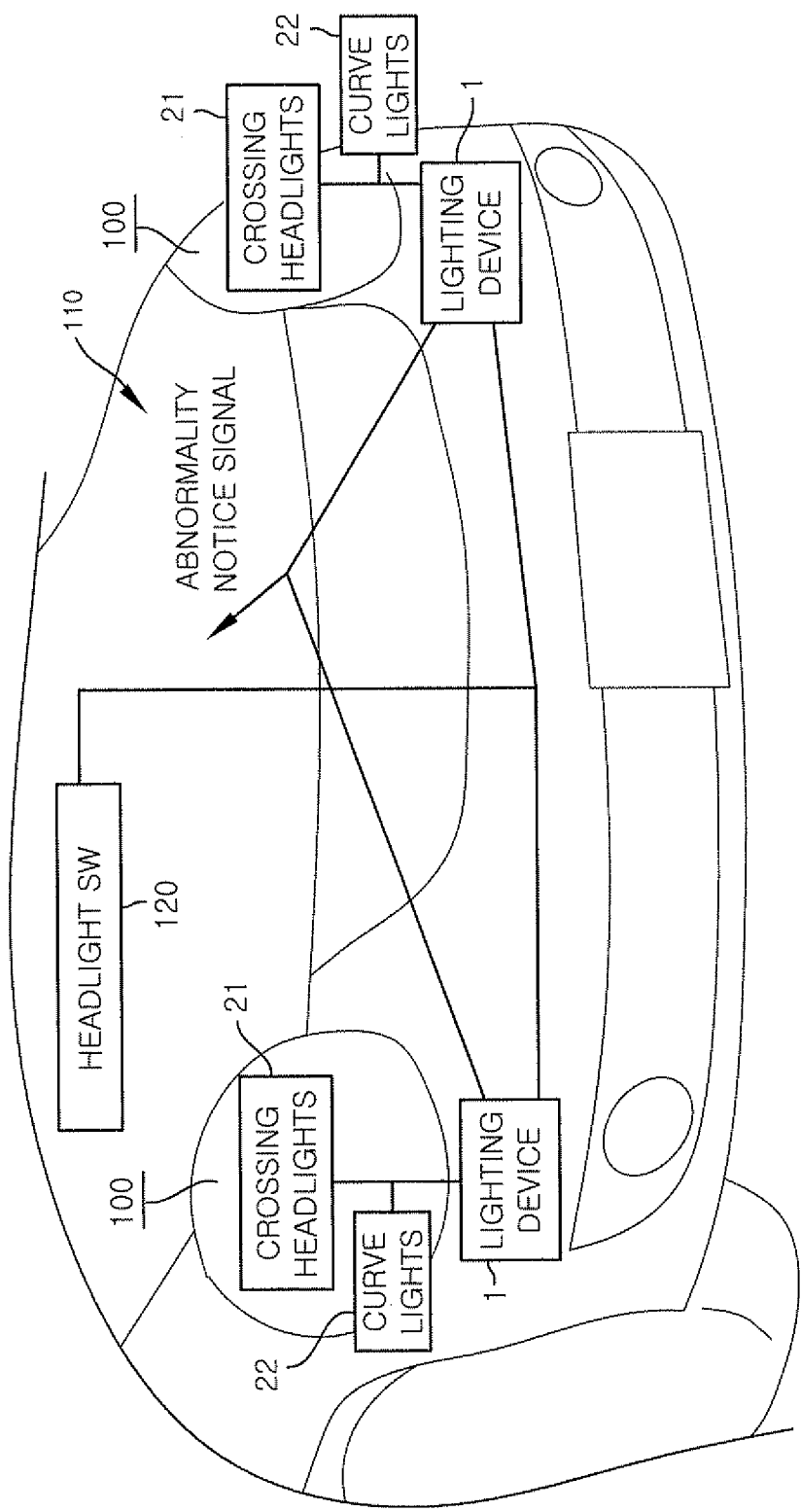
FIG. 6 is a schematic view showing a motor vehicle using the lighting device.

FIG. 5 shows the configuration of a headlamp device 100 equipped with the lighting device 1 configured as above. The headlamp device 100 includes LEDs 21 serving as crossing headlights and LEDs 22 serving as curve lights, both of which are provided within a housing 101. The LEDs 21 and 22 can be turned on by the lighting device 1. While the crossing headlamps and the curve lights are used as the loads 2 in the present embodiment, running headlamps (so-called high beams) mounted to the headlamp device 100, width indicator lamps, fog lamps, daytime running lights, winker lamps or other lamps may be used as the loads 2. FIG. 6 illustrates a motor vehicle 110 equipped with the headlamp device 100.

Figure 7:
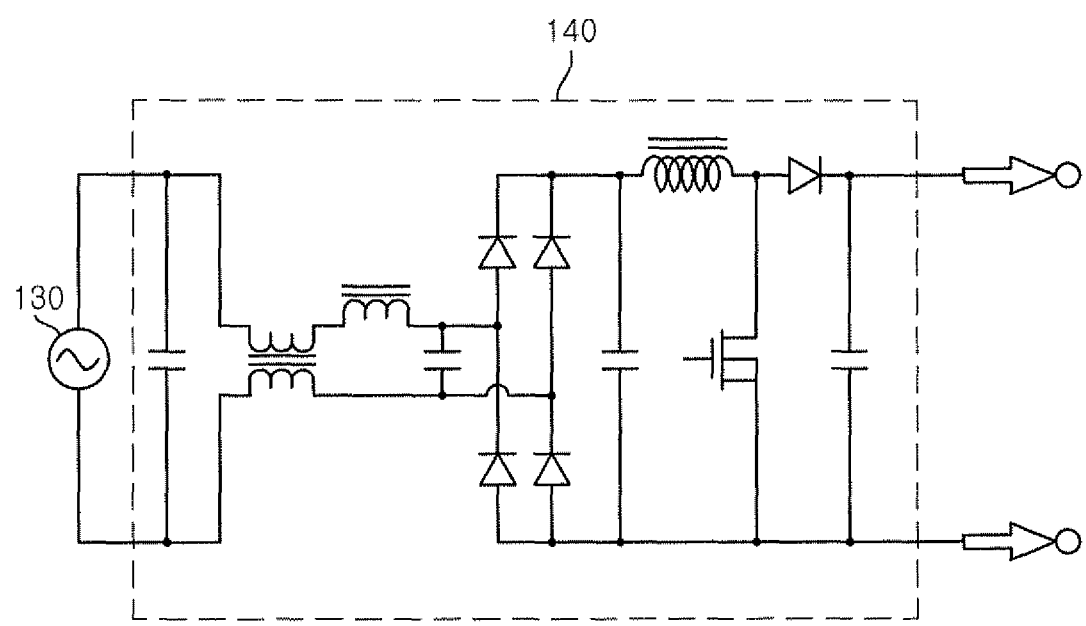
FIG. 7 is a circuit diagram showing an AC-DC converting unit employed in the lighting device.

The lighting device 1 may be designed to be connected to an alternating current source. In this case, the lighting device 1 includes an AC-DC converter 140 provided at the front end of the power converting unit 3 as illustrated in FIG. 7. The AC-DC converter 140 serves to convert an alternating voltage supplied from an alternating current source 130 to a direct voltage. While the AC-DC converter 140 illustrated in FIG. 7 mainly includes a diode bridge and a step-up chopper circuit, the present invention is not limited thereto. The AC-DC converter 140 may includes a diode bridge and a capacitor.

While the power converting unit 3 includes a flyback circuit in the present embodiment, it may include other circuit components such as a step-up chopper, a step-down chopper and a step-up/step-down chopper called an automatic transformer or a choke converter.

The loads 2 turned on by the lighting device 1 are not limited to the LEDs described above. Other semiconductor light sources such as an organic EL element and the like or HID lamps (high-intensity discharge lamps) may be used as the loads 2.

While the lighting device 1 in accordance with the present embodiment detects occurrence of a sudden change in the status of the loads 2 from the change in the output voltages, it may be possible for the lighting device 1 to detect the occurrence of a sudden change in the status of the loads 2 from the change in the output currents. More specifically, the lighting device 1 determines the occurrence of a sudden change in the status of the loads 2 when the output currents are decreased with a variation rate of 0.4 A/ms or more. Since the output currents are decreased after changing over the loads 2, the lighting device 1 switches the constant current control to the constant voltage control if the output currents are decreased with a variation rate of 0.4 A/ms or more.

In particular, the output currents are changed sharply when the loads 2 get opened. Therefore, the lighting device 1 can quickly detect occurrence of a sudden change in the status of the loads 2 by determining the occurrence of a sudden change from the change in the output currents rather than the change in the output voltages.

The lighting device 1 may determine the occurrence of a sudden change in the status of the loads 2 by detecting whether the output currents are changed by a specific magnitude (e.g., 0.12 A) or more within a specific time (e.g., 300 μs). In the determination only using the change rate in the output currents, the lighting device 1 switches the constant current control to the constant voltage control when the output currents are changed only 50 mA within, e.g., 50 μs. However, the output currents may be changed due to a noise or other causes. There is a possibility that the output currents are suddenly changed by a magnitude of about 50 mA.

In view of this, the lighting device 1 determines the occurrence of a sudden change in the status of the loads 2 and switches the constant current control to the constant voltage control when the output currents are changed by a specific magnitude or more within a prescribed time period. This makes it possible to realize noise-resistant control.

In the present embodiment, the switching current value for deciding the timing at which the constant voltage control returns to the constant current control again is set smaller than the current designated value (e.g., 0.7 A), namely the target value for constant current control. This helps realize smooth switching of the constant voltage control to the constant current control. The switching current value is not limited to a specific value.

The same advantageous effects as mentioned above can be attained by, e.g., making the switching current value equal to a specified percentage of the current designated value or setting the switching current value equal to a value resulting from deduction of a specific current value from the current designated value.

The lighting device 1 may be designed to detect the change in the output currents after starting the constant voltage control and to switch the constant voltage control to the constant current control when the variation rate of the change of the output currents becomes positive (when the output currents begin to increase) or if the variation rate becomes equal to or greater than a specific variation rate. This also makes it possible to provide the same advantageous effects as set forth above.

In the present embodiment, the change in the load status is detected from the output voltages or the output currents. However, the change in the load status occurs due to the change in the loads 2 themselves or the power supply. In other words, when there occurs the changeover of the loads 2, the open failure of the loads 2 or the load chattering, the output voltages are increased and the output currents are decreased. In addition, when the loads 2 are short-circuited (partially), the output voltages are decreased and the output currents are increased. Further, when the power supply voltage increases rapidly, the output voltages are increased a little bit (or remain substantially unchanged) and the output currents are increased. When the power supply voltage drops sharply, the output voltages are decreased a little bit (or remain substantially unchanged) and the output currents are decreased.

The change in the load status of the lighting device 1 can be accurately determined by using both the output voltages and the output currents rather than using one of the output voltages and the output currents. This makes it possible to prevent the constant current control from being switched to the constant voltage control due to the conversion of the power supply or other causes.

While the lighting device 1 determines the sudden change in the load status using the average value of the output voltages or the output currents in the present embodiment, the determination may be made by using an instantaneous value. This also makes it possible to provide the same advantageous effects as set forth above. By detecting the output voltages or the output currents in a very short time interval and storing the detected values, the sudden change in the load status may be determined depending on the tendency of the change in the detected values. In other words, the detection of the variation rate of the change in the load status is not affected by the detection cycle or the number of storage times of the output voltages or the output currents.

In the lighting device 1, the output current value available when (or immediately after) the occurrence of a sudden change in the load status is determined may be used as the voltage designated value when performing the constant voltage control. In this case, the determination criteria of the output voltages or the output currents for switching the constant current control to the constant voltage control are preferably set to ensure that the sudden change in the load status can be detected when the variation width of the output voltages resulting from the changeover of the loads 2 becomes greater than the forward voltage Vf2 of the LEDs 22.

Second Embodiment

The lighting device 1 of the present embodiment differs from the lighting device 1 of the first embodiment in that the power converting unit 3 is controlled in a BCM (Boundary Conduction Mode).

Figure 8:
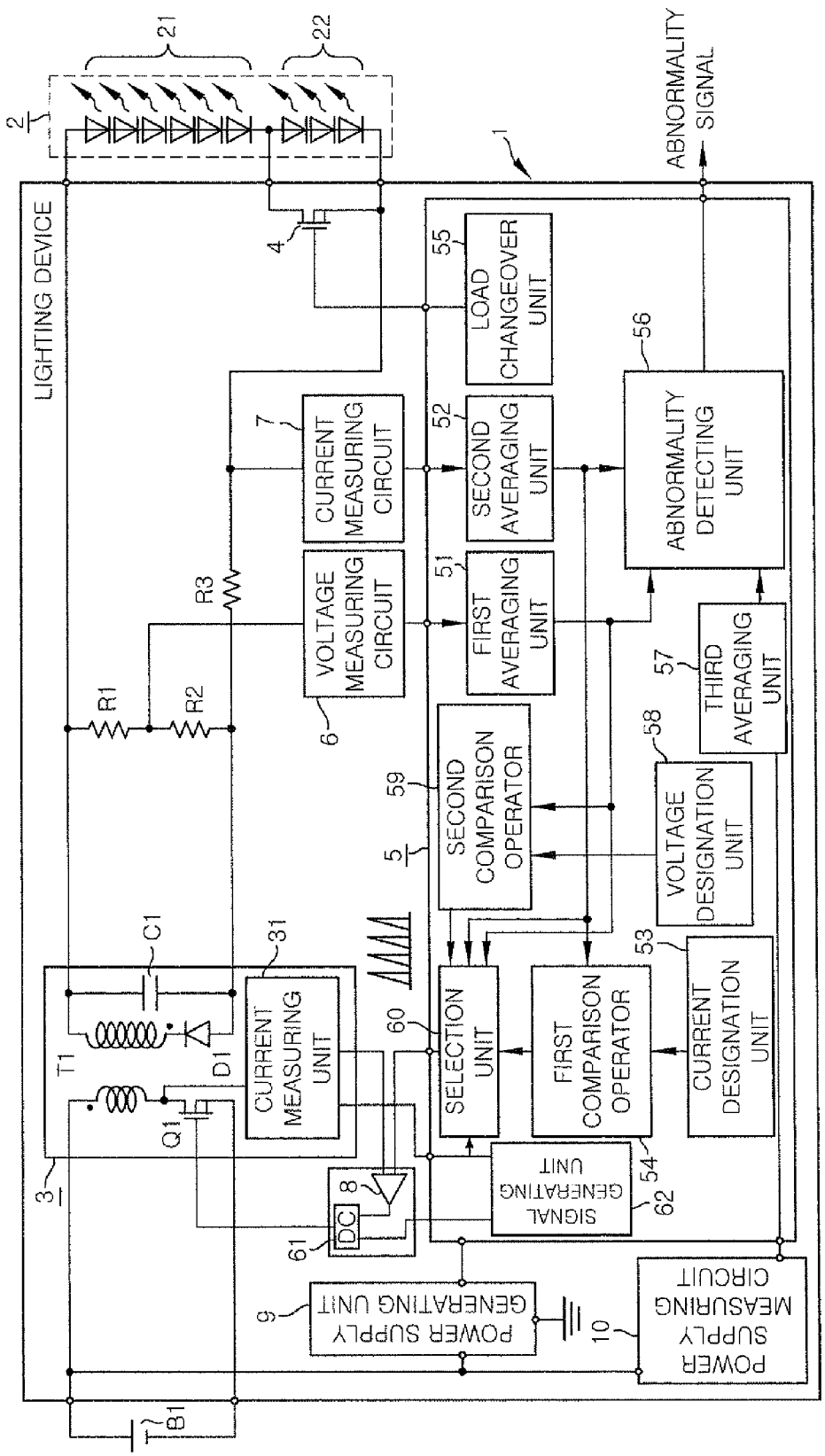
FIG. 8 is a schematic circuit diagram showing the configuration of a lighting device in accordance with a second embodiment.

Referring to FIG. 8, the lighting device 1 of the present embodiment includes a drive circuit (DC) 61 having an RS flip-flop inserted between the output terminal of the comparator 8 and the switching element Q1 and a signal generating unit 62 for outputting an on-signal to the drive circuit 61. The drive circuit 61 has a set terminal to which the signal generating unit 62 is connected and a reset terminal to which the comparator 8 is connected. The signal generating unit 62 outputs an on-signal when the secondary coil current of the transformer T1 becomes zero (discharged). The secondary coil current becoming zero is detected by the current measuring unit 31 by using the decrease in the drain voltage of the switching element Q1 and is notified to the signal generating unit 62 as a discharge completion signal.

Accordingly, the drive circuit 61 turns on the switching element Q1 when the secondary coil current becomes zero and turns off the switching element Q1 when the output of the current measuring unit 31 becomes equal to a control value. In this regard, the flyback circuit is a circuit that performs power conversion by accumulating energy in the transformer T1 when the switching element Q1 is turned on and discharging the accumulated energy to the secondary coil when the switching element Q1 is turned off. This makes it possible for the drive circuit 61 to realize the control (BCM control) through which the accumulation of energy in the transformer T1 is started by turning on the switching element Q1 again upon completing the discharge of energy to the secondary coil during the off-period of the switching element Q1. It is difficult to completely synchronize the on-timing of the switching element Q1 with the discharge of energy. Therefore, a delay of about 100 ns is permitted in the on-timing of the switching element Q1. In other words, the switching frequency varies with the power supply voltages or the output voltages.

While the lighting device 1 of the first embodiment detects the sudden change in the load status by using the change in the output voltages, the lighting device 1 of the present embodiment determines the sudden change in the load status by using the continuous increase in the drive frequency (switching frequency) of the switching element Q1. The selection unit 60 periodically detects the change of the drive frequency from the discharge completion signal supplied by the current measuring unit 31.

While the lighting device 1 of the first embodiment performs only the processing in which the voltage designated value is set upon detecting the sudden change in the load status, the lighting device 1 of the present embodiment additionally performs reduction of the drive frequency. More specifically, the lighting device 1 performs BCM control until the sudden change in the load status is detected. After detecting the sudden change in the load status, the lighting device 1 performs a DCM (Discontinuous Current Mode) control with a standby time period left between the time when the secondary coil current becomes zero and the time when the on-signal is outputted. In other words, the lighting device 1 performs the switching control with a delay time period left between the time when the discharge of energy to the secondary coil of the transformer T1 is completed and the time when the switching element Q1 is turned on again. This prolongs the off-time of the switching element Q1.

While the lighting device 1 of the first embodiment determines the necessity of returning the constant voltage control to the constant current control depending on whether the output currents become equal to or greater than a specific value, the lighting device 1 of the present embodiment returns the constant voltage control to the constant current control when a specific time is lapsed after setting the voltage designated value.

Figure 9:
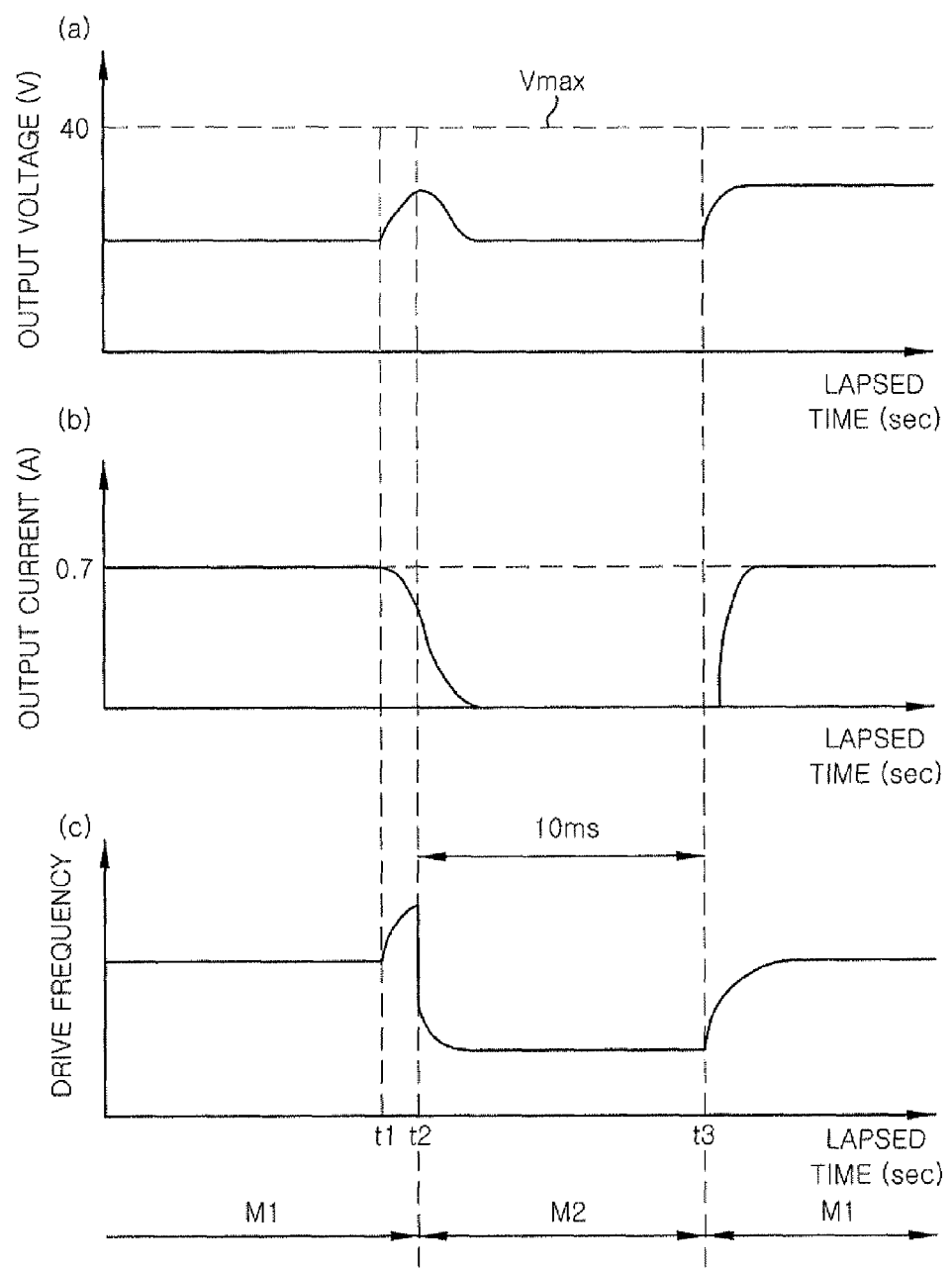
FIG. 9 depicts graphs for explaining an operation of the lighting device.

(a), (b) and (c) of FIG. 9 show the changes in the output voltages, the output currents and the drive frequency of the switching element Q1 when the loads 2 are changed over by the load changeover unit 55 in the lighting device 1 of the present embodiment. In (a), (b) and (c) of FIG. 9, the horizontal axis indicates the lapsed time. The vertical axis in (a) of FIG. 9 indicates the output voltages, the vertical axis in (b) of FIG. 9 indicating the output currents and the vertical axis in (c) of FIG. 9 indicating the drive frequency.

If the bypass switch 4 is turned off by the load changeover unit 55 and the LEDs 22 are additionally turned on at time t1, the output voltages are increased and the output currents are decreased with momentary increase of the drive frequency in synchronism with the increase of the output voltages. The lighting device 1 switches the constant current control to the constant voltage control by detecting the situation that the drive frequency that can be detected earlier than the feedback time constant of the constant current control is continuously and sharply increased at time t2. For example, the lighting device 1 detects the drive frequency every 50 μs, and if the drive frequency is increased four consecutive times, the lighting device 1 determines the sudden change in the load status and switches the constant current control to the constant voltage control.

In this regard, the voltage designated value for performing the constant voltage control is the voltage value at the time before the drive frequency begins to increase (at time t1). As the constant current control is switched to the constant voltage control, the lighting device 1 performs the control for limiting the drive frequency and switches the BCM control to the DCM control.

Figure 10:
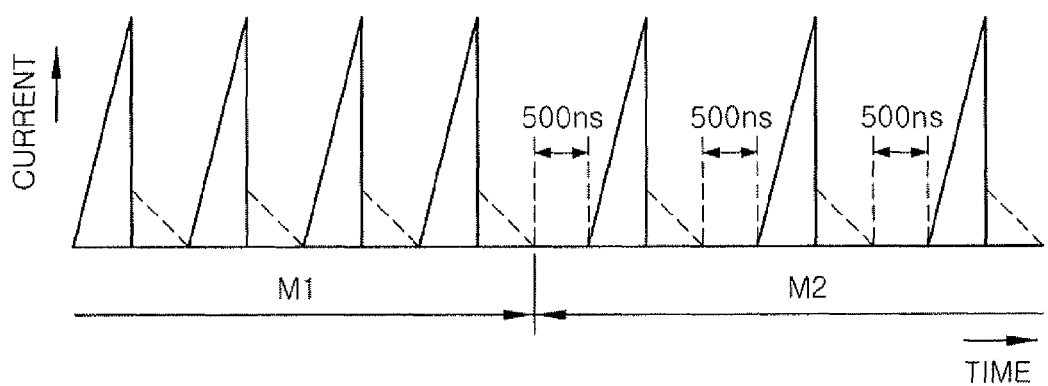
FIG. 10 is a view for explaining an operation of the lighting device.

FIG. 10 shows a waveform of an electric current flowing through the transformer T1 of the power converting unit 3 when the BCM control (period M1) is switched to the DCM control (period M2). In FIG. 10, the electric current flowing through the primary coil of the transformer T1 is indicated by solid lines and the electric current flowing through the secondary coil is indicated by broken lines. The on-time period of the switching element Q1 (the peak current value) remains the same in either of the control modes. Only the off-time period is prolonged by 500 ns in the DCM control.

The lighting device 1 switches the constant voltage control to the constant current control again at the time point (time t3) lapsed a specific time (10 ms in the present embodiment) after the constant current control is switched to the constant voltage control. No electric current flows during the constant voltage control. By switching the constant voltage control to the constant current control again before the switching is sensed by the human eyes, it is possible for the lighting device 1 to realize the switching, for the suppression of overshooting, from the constant voltage control to the constant current control.

With the lighting device 1 of the present embodiment described above, it is possible to prevent the increase in the output voltages even when the loads 2 suffer from the open failure, thereby preventing breakage of a circuit. Although the output voltages may be increased during the switching from the constant current control to the constant voltage control, the lighting device 1 can prevent the increase in the output voltages by detecting the increase in the drive frequency of the switching element Q1 once again.

Even if the load chattering occurs, the lighting device 1 can prevent flow of an excessive current during reconnection of the loads 2 by keeping the output voltages in the constant voltage control equal to the output voltage value at the time before the sudden change in the load status. In general, the loads 2 are reconnected within several milliseconds (within 3 ms) during the load chattering. Therefore, when the constant voltage control is switched to the constant current control after 10 ms, the loads 2 remain connected. Thanks to this feature, the lighting device 1 is capable of immediately realizing the constant current control upon reconnection of the loads 2 by keeping the output voltage value at the time of reconnection of the loads 2 equal to the voltage value at the time before the load chattering.

In the BCM control in the present embodiment, the discharge in the secondary coil becomes fast and the drive frequency grows high when the output voltages are increased. Therefore, the selection unit 60 is capable of indirectly detecting the increase of the output voltages by using the drive frequency. In case where the selection unit GO detects the output voltages or the output currents through AD conversion, the detection of the sudden change in the load status may sometimes be delayed due to the averaging processing for noise removal or the filter of an external circuit. In contrast, the selection unit 60 of the present embodiment can detect the sudden change in the load status without delay because it can directly detect the switching frequency of the switching element Q1 as the drive frequency.

Since no electric power is consumed when the loads 2 suffer from the open failure, the output voltages of the power converting unit 3 are increased with ease. Under the BCM control, when the output voltages are increased, the drive frequency grows high and the output becomes great even while the on-time of the switching element Q1 remains the same. Inasmuch as the on-time of the switching element Q1 is determined by the output value of the current measuring unit 31, time is required in reducing the output voltages even while the constant voltage control is performed to avoid the time delay caused by the filter or the like. Therefore, even if the lighting device 1 performs the constant voltage control, the output voltages are likely to overshoot. In view of this, the lighting device 1 in accordance with the present embodiment reduces the drive frequency during the constant voltage control, thereby facilitating the output reduction control and realizing the constant voltage control free from the overshooting of the output voltages.

The lighting device 1 performs the constant voltage control when the loads 2 are changed over (when the LEDs 22 are turn-on). It is sometimes the case that the output currents are not increased due to the abnormality of the loads 2, e.g., the failure of the inserted LEDs 22 and the increase in the resistance value thereof. With the configuration of the present embodiment, it is possible to prevent occurrence of the aforementioned problem because the constant voltage control is switched to the constant current control when a specific time lapses after the switching to the constant voltage control. The lighting device 1 performs the constant voltage control within 10 ms, thereby preventing a person from recognizing the change of the light output during that time.

While the lighting device 1 performs the constant voltage control within 10 ms in the present embodiment, a person cannot sense flickering if the loads 2 are blinked at a frequency of about 50 Hz or more. It appears that the loads 2 are reconnected within about 3 ms during the load chattering. Accordingly, the time of the constant voltage control performed by the lighting device 1 is not limited to 10 ms but may be arbitrarily set within a range of from 3 ms to 20 ms.

While the highly-functional lighting device 1 having a function of changing over the loads 2 has been illustrated in the present embodiment, the function of switching the constant current control and the constant voltage control is also useful in a lighting device with no function of changing over the loads 2. In other words, even if the load changeover unit 55 and the bypass switch 4 are omitted from the configuration shown in FIG. 8, the lighting device can get the same advantageous effects as those of the above-described lighting device 1 when the open failure of the loads 2 or the load chattering occurs. In this case, it is desirable that, as in the first embodiment, the lighting device 1 determine the necessity of returning the constant voltage control to the constant current control depending on whether the output currents become equal to or greater than a specific value (the switching current value).

Figure 11:
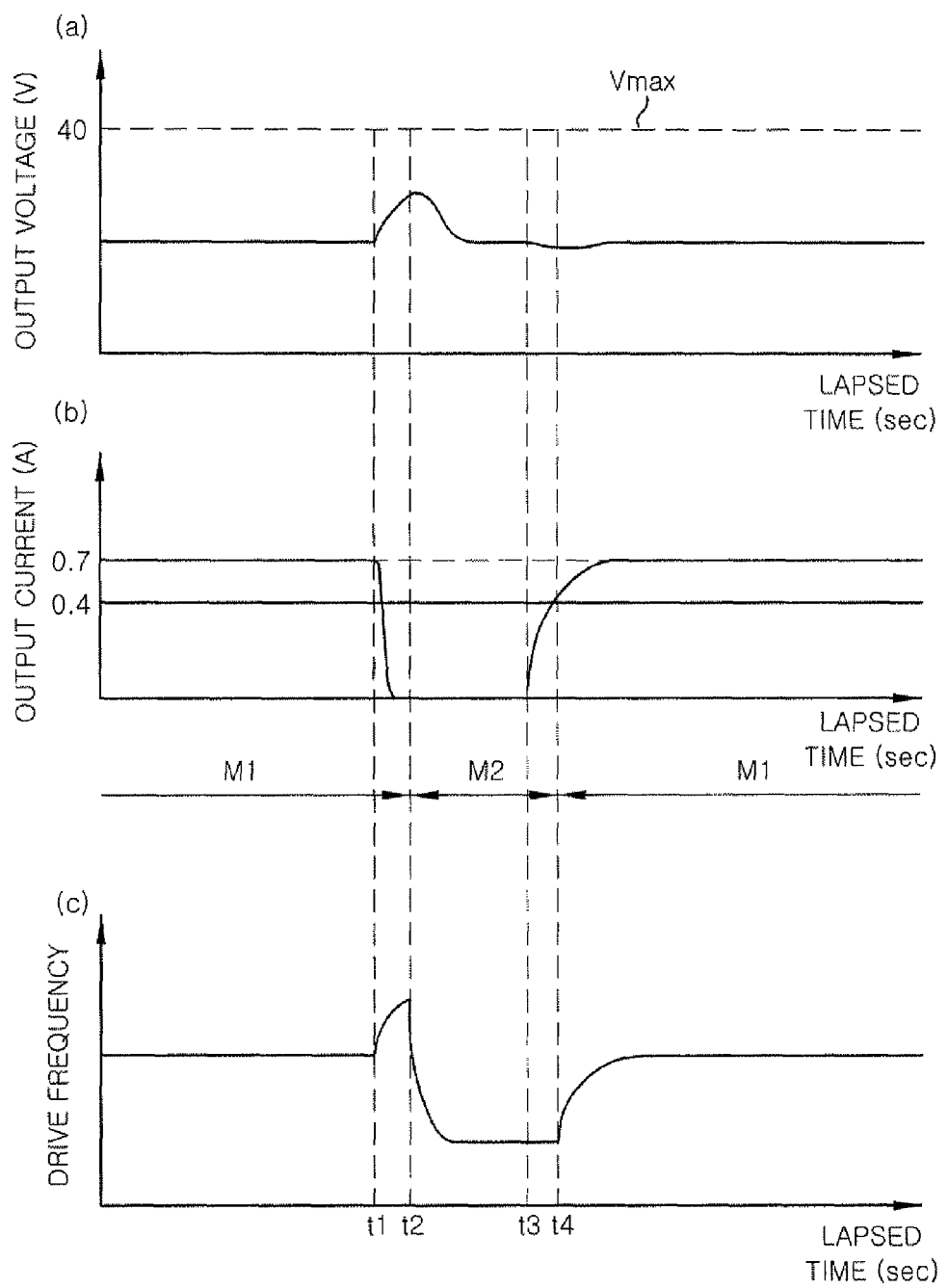
FIG. 11 shows graphs for explaining an operation of the lighting device.

(a), (b) and (c) of FIG. 11 show the changes in the output voltages, the output currents and the drive frequency in the lighting device 1 having no load changeover function when the load chattering during which the loads 2 are opened only momentarily occurs.

When the load chattering occurs at time t1 and the loads 2 get opened, the output currents become zero and the output voltages begin to increase. The drive frequency is instantaneously increased in synchronism with the increase in the output voltages. The lighting device 1 detects the consecutive increase in the drive frequency at time t2 and switches the constant current control to the constant voltage control. In order to reduce the drive frequency, the lighting device 1 switches the BCM control to the DCM control.

Thereafter, the output voltages are decreased and kept constant under the constant voltage control and the loads 2 are reconnected at time t3. Since the output voltage value at the time of reconnection of the loads 2 is kept equal to the output voltage value available before the sudden change in the load status occurs (during the constant current control), the output currents begin to flow immediately after reconnection of the loads 2 and become greater than the switching current value (0.4 A) at time t4. In response, the lighting device 1 comes into the constant current control to control the output currents constant.

As set forth above, the lighting device 1 determines the necessity of returning the constant voltage control to the constant current control depending on whether the output currents become equal to or greater than the switching current value. This makes it possible to shorten the duration under the constant voltage control at the time of occurrence of the load chattering. In the configuration in which the constant voltage control is switched to the constant current control when a specific time lapses after the switching to the constant voltage control, time is required in controlling the loads 2 under the constant voltage control. Therefore, the output currents may possibly fail to reach a specific value for a while. With the configuration of the present embodiment described above, however, the output currents are kept constant.

At the time of open failure of the loads 2, the constant voltage control continues to be performed with no increase of the output currents. This makes it possible to prevent the output voltages from increasing excessively, which assists in protecting the lighting device 1. The load abnormality is detected by detecting the fact that the output currents continue to be zero.

In case where the lighting device 1 having a load changeover function determines the necessity of returning the constant voltage control to the constant current control depending on whether the output currents become equal to or greater than the switching current value, it is sometimes the case that the output currents do not flow and the constant voltage control is not switched to the constant current control even when the loads 2 are changed over and the output voltages are increased. In the lighting device 1 having a load changeover function, therefore, it is preferable to employ the configuration in which the constant voltage control is switched to the constant current control when a specific time lapses after the switching to the constant voltage control.

Figure 12:
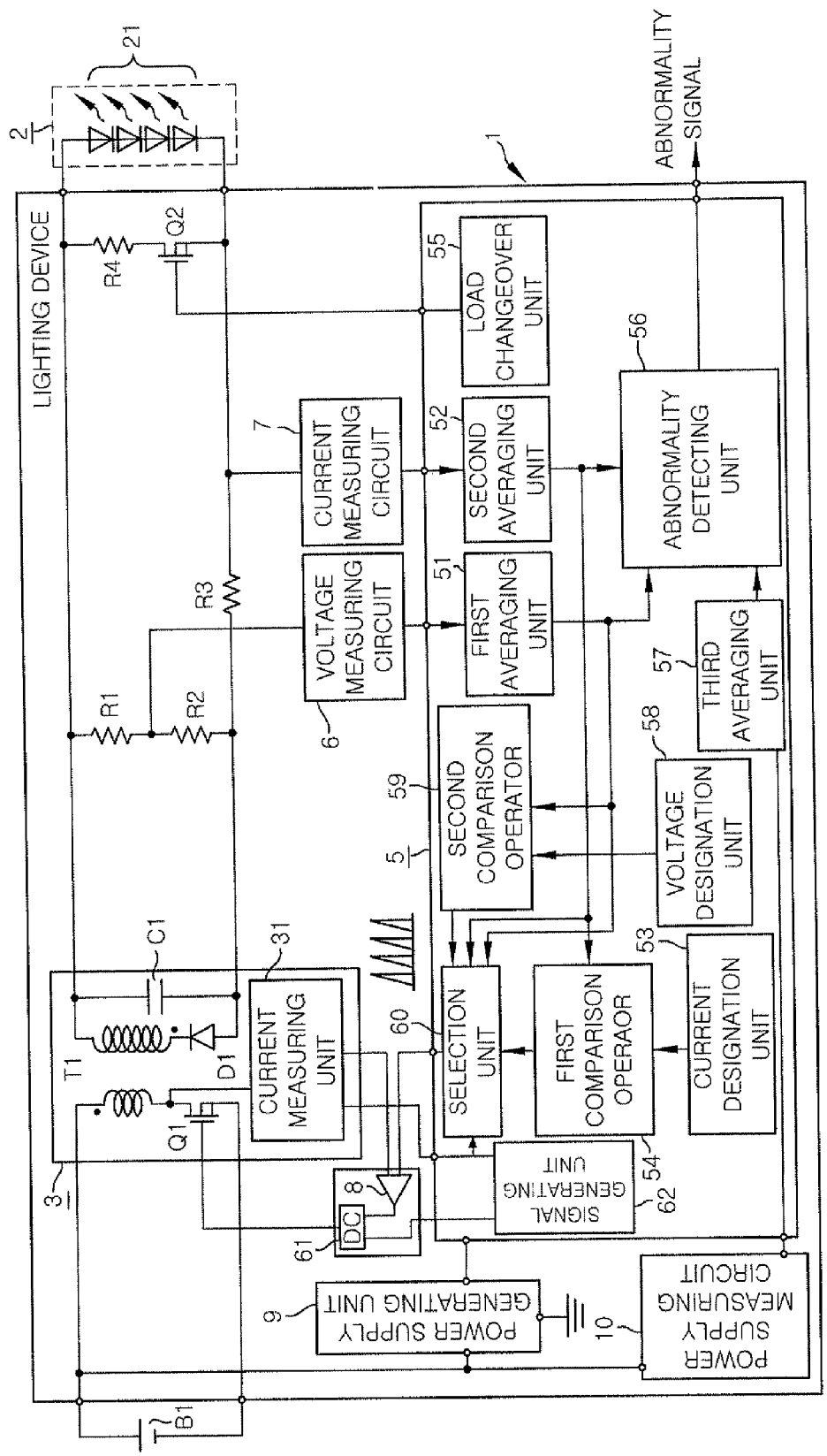
FIG. 12 is a schematic circuit diagram showing a modified example of the lighting device.

While the lighting device 1 of the present embodiment prevents a rapid increase in the output voltages during the load chattering by reducing the drive frequency when the constant current control is switched to the constant voltage control, the present invention is not limited thereto. As shown in FIG. 12, the lighting device 1 may include, e.g., a serial circuit of a resistor R4 and a switching element Q2 including a MOSFET. The serial circuit is arranged at the primary side of the transformer T1 of the power converting unit 3 and serves as a consumption circuit.

In this configuration, the drive frequency is reduced and the switching element Q2 is turned on to prevent the rapid increase in the output voltages. The microcomputer 5 functions as a consumption circuit connecting unit 65 for on/off controlling the switching element Q2. By connecting the resistor R4 between the output terminals of the power converting unit 3 in this manner, the output of the power converting unit 3 is partially consumed by the resistor R4. Thus, it is possible for the lighting device 1 to prevent the rapid increase in the output voltages. Alternatively, the lighting device 1 may prevent any increase in the output voltages by connecting the consumption circuit but without changing the drive frequency.

Instead of providing the resistor R4 as the consumption circuit within the lighting device 1, it may be possible to employ a configuration in which an additional bypass switch is arranged in a parallel relationship with the LEDs 21 to independently turn on the LEDs 21 and 22. In this configuration, when the load chattering occurs during the on-time of one set of LEDs, the other set of LEDs is also turned on. Accordingly, it is possible to provide an advantageous effect of preventing the rapid increase in the output voltages.

Other configurations and functions remain the same as those of the first embodiment.

Third Embodiment

Figure 13A:
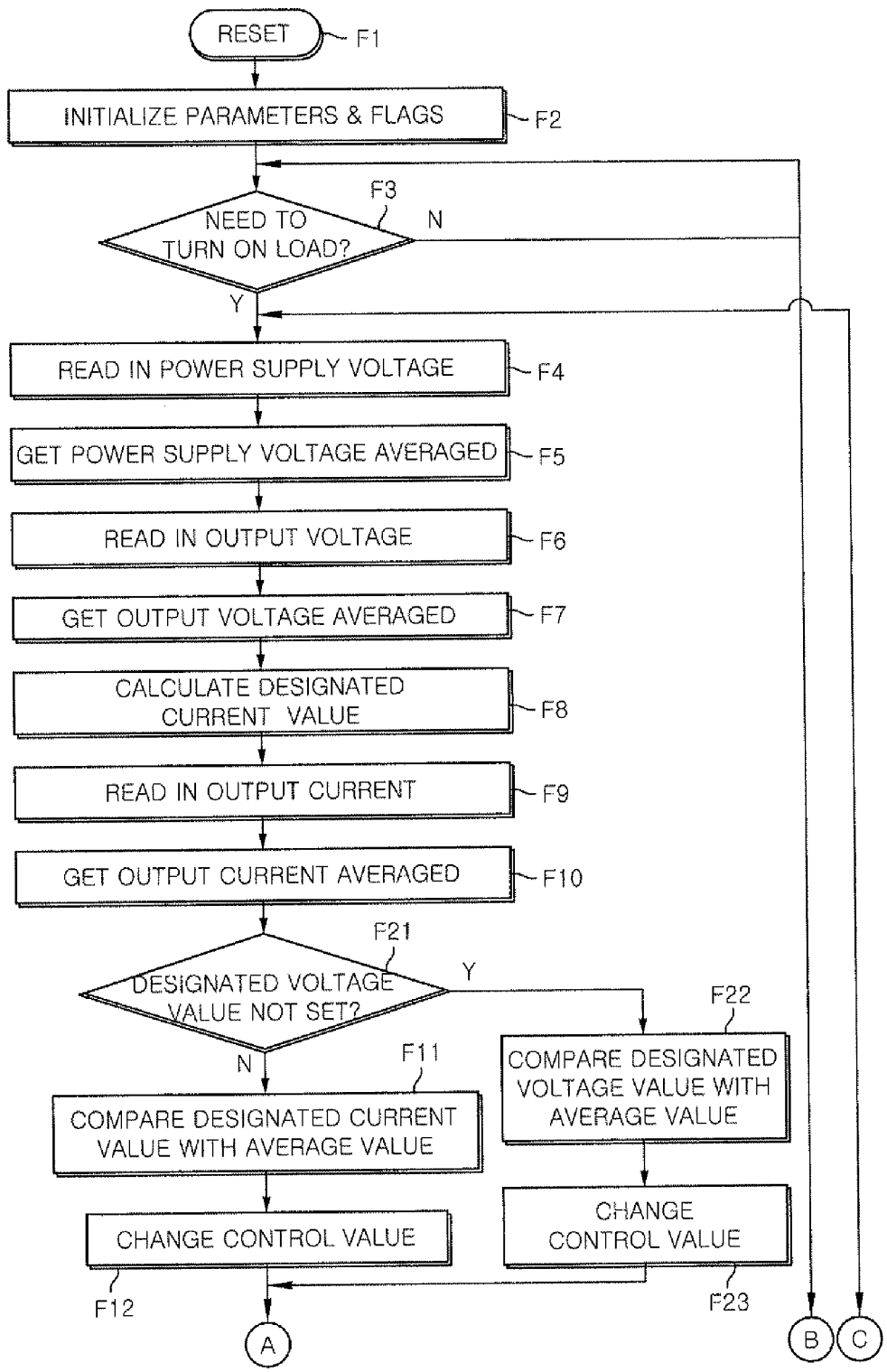
FIGS. 13A and 13B shows a flowchart illustrating an operation of a microcomputer employed in a lighting device in accordance with a third embodiment.
Figure 13B:
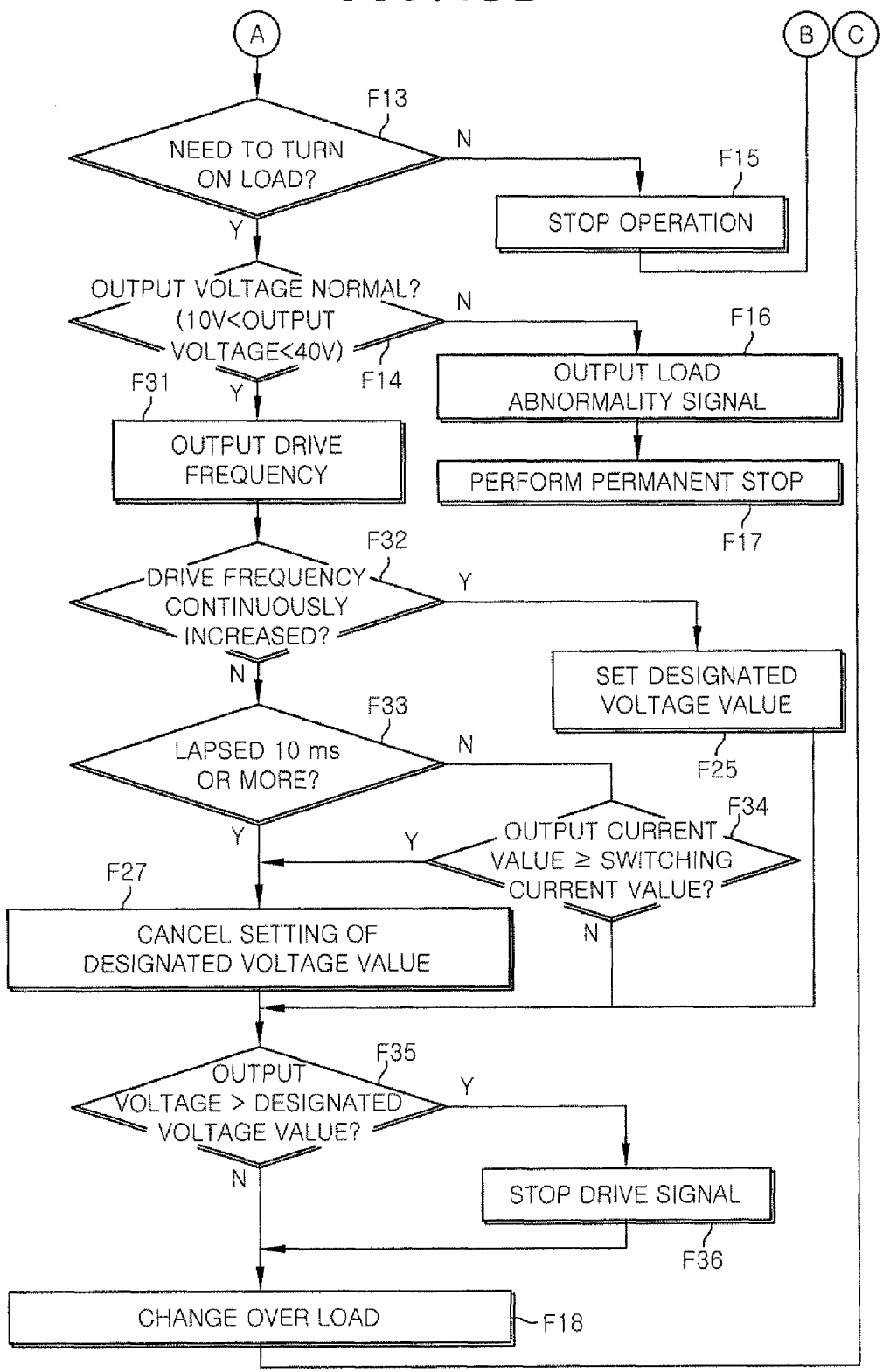

The lighting device 1 of the present embodiment differs from the lighting device 1 of the second embodiment in that, as shown in FIG. 13B, there is an additional step of stopping the drive signal (step F36) when the output voltages are greater than the voltage designated value (step F35). Moreover, the lighting device 1 of the present embodiment is designed to return to the constant current control if a specific time (e.g., 10 ms) lapses after the switching to the constant voltage control (step F33) or if the output currents reach the switching current value (e.g., 0.4 A) (step F34). In FIG. 13B, the step of detecting the drive frequency (step F31) and the step of detecting the sudden change in the load status from the consecutive increase in the drive frequency (step F32) are the same as described above in the second embodiment.

Figure 14:
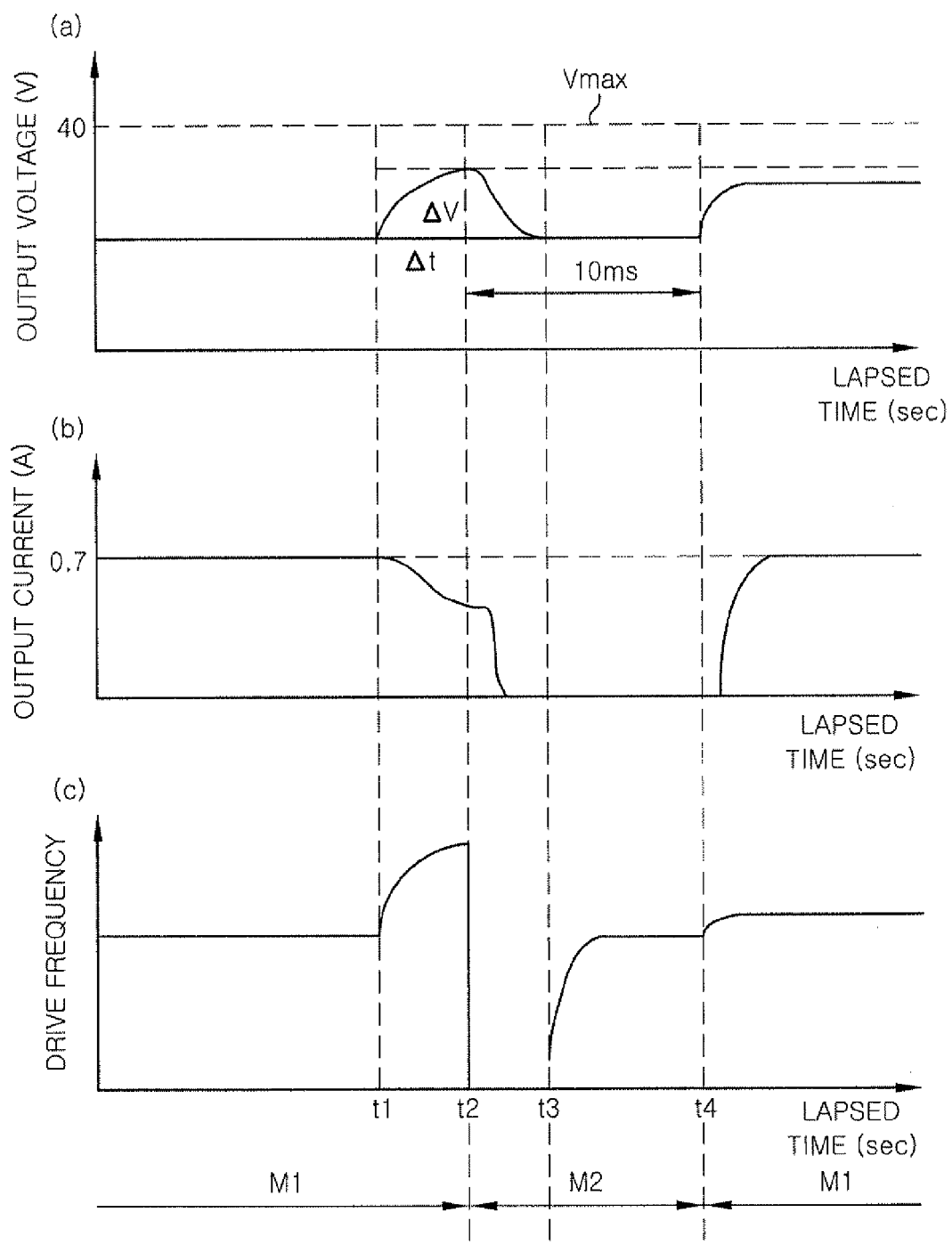
FIG. 14 illustrates graphs for explaining an operation of the lighting device.

(a), (b) and (c) of FIG. 14 show the changes of the output voltages, the output currents and the drive frequency of the switching element Q1 in the lighting device 1 of the present embodiment when the loads 2 are changed over by the load changeover unit 55. In (a), (b) and (c) of FIG. 14, the horizontal axis indicates the lapsed time. The vertical axis in (a) of FIG. 14 indicates the output voltages, the vertical axis (b) of in FIG. 14 indicating the output currents and the vertical axis in (c) of FIG. 14 indicating the drive frequency.

When the bypass switch 4 is turned off by the load changeover unit 55 and the LEDs 22 are turn-on at time t1, the output voltages are increased and the output currents are decreased while the drive frequency is momentarily increased in synchronism with the increase of the output voltages. The lighting device 1 switches the constant current control to the constant voltage control by detecting the situation that the drive frequency detected earlier than the feedback time constant of the constant current control is continuously increased at time t2.

In the present embodiment, the voltage designated value for use in performing the constant voltage control is set equal to the voltage value at the time immediately before the drive frequency begins to increase (when the output is stable). Therefore, at time t2, the output voltages become greater than the voltage designated value, in response to which the lighting device 1 stops the drive signal. The stoppage of the drive signal causes the output voltages to rapidly decrease. When the output voltages fall below the voltage designated value (at time t3), the drive circuit 61 begins to output the drive signal again, thus allowing the lighting device 1 to perform the constant voltage control.

Figure 15:
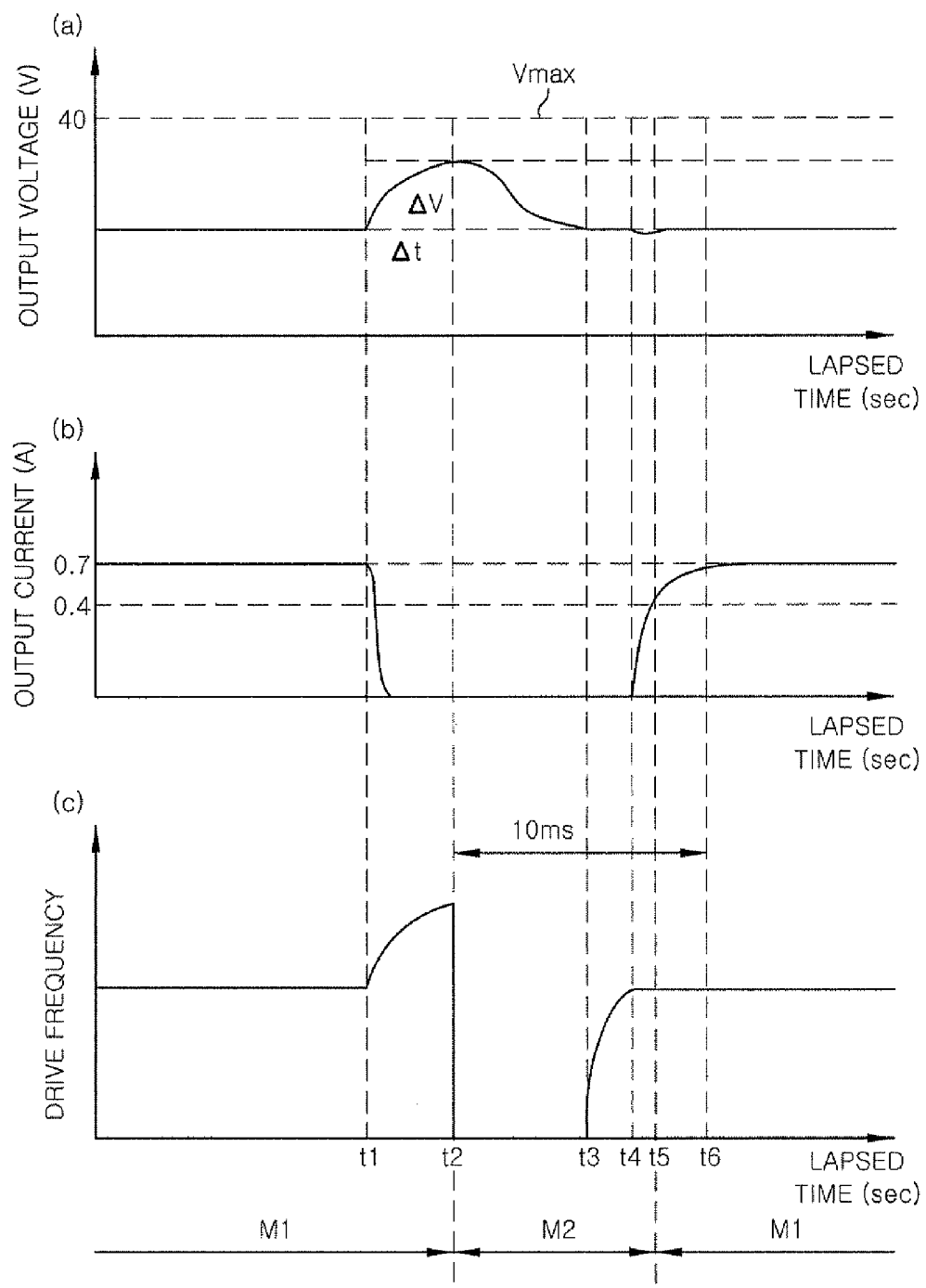
FIG. 15 depicts graphs for explaining an operation of the lighting device.

(a), (b) and (c) of FIG. 15 show changes of the output voltages, the output currents and the drive frequency of the switching element Q1 in the lighting device 1 of the present embodiment when the load chattering during which the loads 2 are opened momentarily occurs. In FIG. 15, the horizontal axis indicates the lapsed time. The vertical axis in (a) of FIG. 15 indicates the output voltages, the vertical axis in (b) of FIG. 15 indicating the output currents and the vertical axis in (c) of FIG. 15 indicating the drive frequency.

When the loads 2 are opened due to the occurrence of the load chattering (at time t1), the output currents become zero and the output voltages begin to increase while the drive frequency is momentarily increased in synchronism with the increase of the output voltages. The lighting device 1 switches the constant current control to the constant voltage control by detecting the situation that the drive frequency detected earlier than the feedback time constant of the constant current control is continuously increased at time t2. Thereafter, the lighting device 1 stops the drive signal to rapidly reduce the output voltages. When the output voltages fall below the voltage designated value (at time t3), the drive circuit 61 begins to output the drive signal again to perform the constant voltage control.

Subsequently, when the loads 2 are reconnected at time t4, the output currents begin to flow at once and exceed the switching current value (e.g., 0.4 A). This is because the output voltage value at the time of connection of the loads 2 is set equal to the output voltage value available during the constant current control. At this time, the lighting device 1 switches the constant voltage control to the constant current control, thereby realizing an overshoot-free switching operation.

With the lighting device 1 of the present embodiment described above, it is possible to shorten the duration under the constant voltage control at the time of occurrence of the load chattering, and to cope with both the load changeover and the load chattering in a reliable manner. In the lighting device 1 of the second embodiment, time is required in controlling the loads 2 under the constant voltage control. Therefore, there may possibly exist a time period during which the output currents may not reach a specific current value. In the configuration of the present embodiment, however, the output currents are kept constant.

At the time of occurrence of the load chattering, the magnitude of the output voltages varies with the status of the loads 2. Therefore, an excessive current may sometimes flow when the loads 2 are reconnected when the output voltages remain greater than the forward voltage Vf of the loads 2. In the lighting device 1 of the present embodiment, however, the drive signal is stopped when the output voltages are greater than the voltage designated value. Thus, the output voltages are decreased rapidly and the excessive current mentioned above is hardly to flow.

Figure 16:
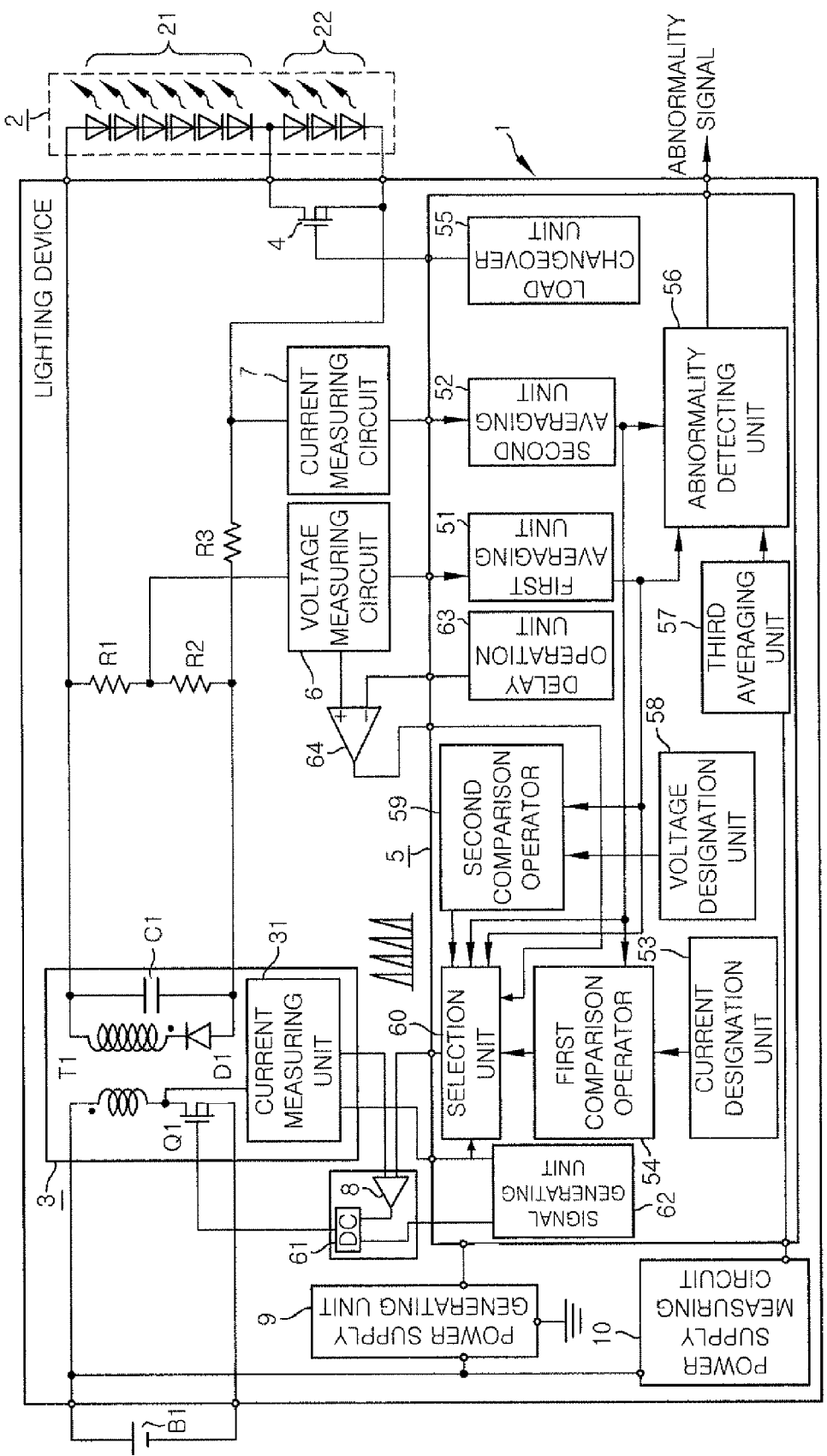
FIG. 16 is a schematic circuit diagram showing the configuration of the lighting device.

While the sudden change in the load status is detected from the increase in the drive frequency in the lighting device 1 of the present embodiment, the present invention is not limited thereto. The sudden change in the load status may be detected by using the change of the measurement values in the voltage measuring circuit 6. In this case, as shown in FIG. 16, the lighting device 1 includes a delay operation unit 63 for outputting a value obtained by adding a specific additional value (e.g., 10V) to the average value of the measurement values of the voltage measuring circuit 6 which were available a specific time ago (e.g., 200 µs). The lighting device 1 further includes a comparator 64 for comparing the measurement values of the voltage measuring circuit 6 with the output of the delay operation unit 63. The comparator 64 outputs a switching trigger to the selection unit 60 of the microcomputer 5 when the measurement values of the voltage measuring circuit 6 exceed the output of the delay operation unit 63.

Figure 17:
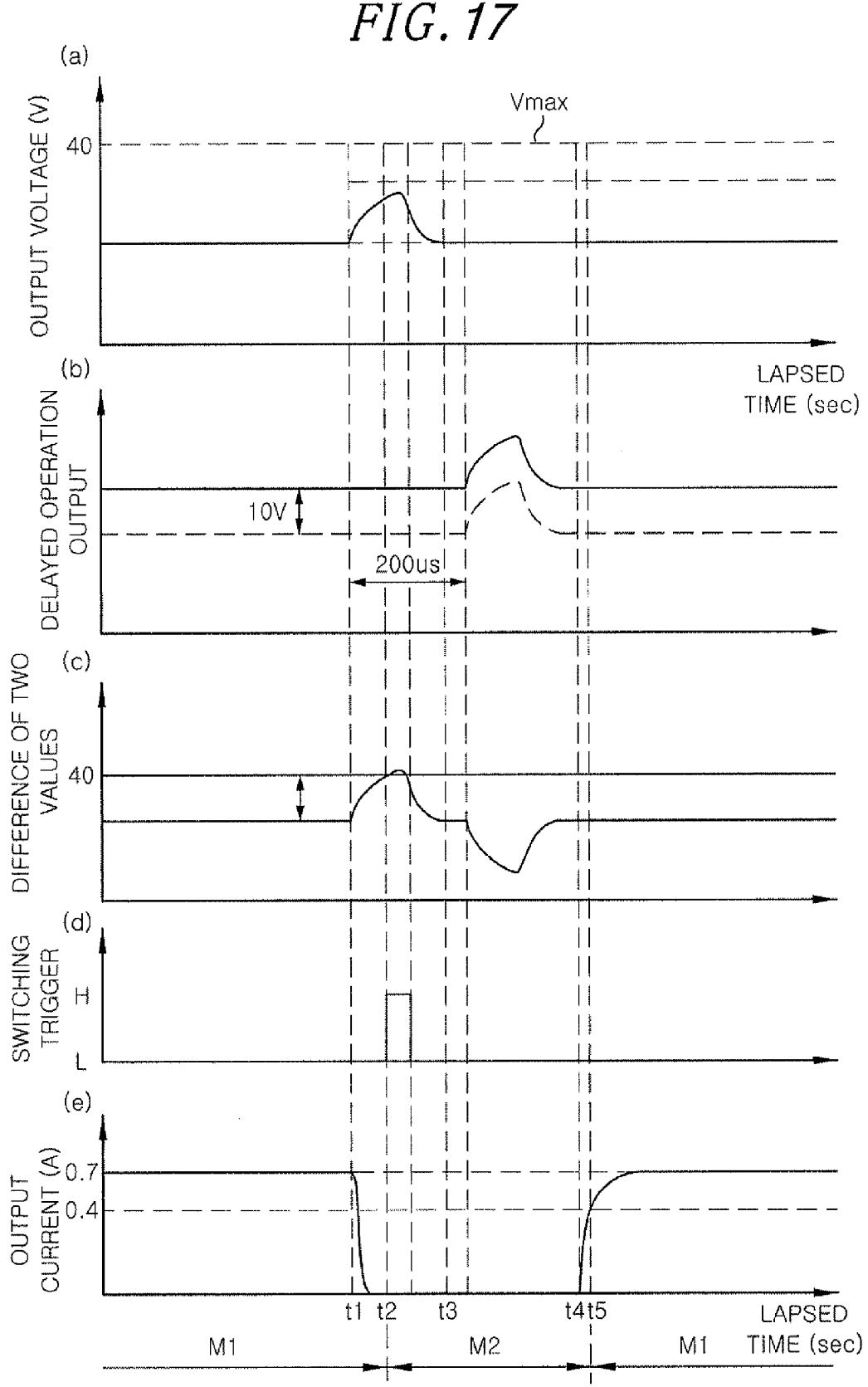
FIG. 17 shows graphs for explaining an operation of the lighting device.

(a) to (e) of FIG. 17 show changes in the output voltages and the output currents in the configuration of the lighting device 1 shown in FIG. 16 when the load chattering during which the loads 2 are opened momentarily. In (a) to (e) of FIG. 17, the horizontal axis indicates the lapsed time. The vertical axis in (a) of FIG. 17 indicates the output voltages, that in (b) of FIG. 17 indicating the output of the delay operation unit 63, that in (c) of FIG. 17 indicating the difference between the output voltages and the output of the delay operation unit 63, that in (d) of FIG. 17 indicating the switching trigger and that in (e) of FIG. 17 indicating the output currents.

When the loads 2 are opened due to the occurrence of the load chattering (at time t1), the output currents become zero and the output voltages begin to increase. In this regard, the delay operation unit 63 outputs a value obtained by adding 10V to the output voltage value that was available 200 µs ago. Therefore, if the output voltages are not changed by 10V or more within 200 µs, the difference of two values (obtained by subtracting the output of the delay operation unit 63 from the output voltages) becomes positive and the switching trigger becomes "H" (at time t2).

The selection unit 60 detects the switching trigger and switches the constant current control to the constant voltage control. The voltage designated value for use in performing the constant voltage control is set equal to the value available immediately before the drive frequency begins to increase (when the output is stable). Therefore, the output voltages become greater than the voltage designated value (at time t2), in response to which the lighting device 1 stops the drive signal. Thereafter, the output voltages are rapidly decreased. When the output voltages fall below the voltage designated value, the drive circuit 61 begins to output the drive signal again (at time t3), thus allowing the lighting device 1 to perform the constant voltage control.

Subsequently, when the loads 2 are reconnected at time t4, the output currents begin to flow at once and exceed the switching current value (e.g., 0.4 A). This is because the output voltage value at the time of reconnection of the loads 2 is set equal to the output voltage value during the constant current control. At this time, the lighting device 1 switches the constant voltage control to the constant current control, thereby realizing an overshoot-free switching operation.

By detecting the sudden change in the load status by using the change in the measurement values of the voltage measuring circuit 6 as set forth above, it is possible to fast detect the sudden change in the load status and to prevent any excessive increase in the output voltages. In other words, the lighting device 1 inputs the switching trigger from an analog circuit to the microcomputer 5. Therefore, as compared with the case of detecting the time delay of an external filter or the consecutive increase in the drive frequency, it is possible to shorten the time taken from the sudden change in the load status to the startup of the constant voltage control.

While the microcomputer 5 identifies the switching trigger through polling in the present embodiment, the time taken from the sudden change in the load status to the startup of the constant voltage control can be shortened by switching the constant current control to the constant voltage control by using an interrupt. While the delayed time of the delay operation unit 63 is 200 µs and the added voltage value is 10V in the present embodiment, these values are nothing more than examples and are not limitative.

Other configurations and functions remain the same as those of the second embodiment.

While the invention has been shown and described with respect to the embodiments, it will be understood by those skilled in the art that various changes and modification may be made without departing from the scope of the invention as defined in the following claims.

What is claimed is:

1. A lighting device comprising:
    a power converting unit for converting an input direct current power to an output direct current power required in loads;
    a voltage measuring unit for measuring an output voltage from the power converting unit or a value equivalent to the output voltage;
    a current measuring unit for measuring an output current from the power converting unit or a value equivalent to the output current; and
    a control unit for controlling the power converting unit,
    wherein, when at least one of the output voltage and the output current of the power converting unit is changed by a specific magnitude per unit hour, the control unit determines that a change in a load status has occurred and controls the power converting unit by switching constant current control in which a measurement value of the current measuring unit is kept at a specific current designated value to constant voltage control in which a measurement value of the voltage measuring unit is kept at a specific voltage designated value.

2. The lighting device of claim 1, wherein the voltage designated value is a value obtained by adding a specific additional value to the output voltage at a time before the control unit determines that the change in the load status has occurred.

3. The lighting device of claim 1, wherein the voltage designated value is a measurement value of the voltage measuring unit at a time before the control unit determines that the change in the load status has occurred.

4. The lighting device of claim 1, wherein the voltage designated value is a measurement value of the voltage measuring unit available after the control unit determines that the change in the load status has occurred.

5. The lighting device of claim 1, wherein the control unit performs the constant voltage control of the power converting unit for a specific time and switches the constant voltage control to the constant current control after the specific time is lapsed.

6. The lighting device of claim 1, wherein the control unit switches the constant voltage control to the constant current control when the measurement value of the current measuring unit is increased to a specific switching threshold value after the constant current control is switched to the constant voltage control.

7. The lighting device of claim 6, wherein the switching threshold value is set smaller than the current designated value.

8. The lighting device of claim 1, wherein, when the measurement value of the voltage measuring unit is changed by 15 V or more within 300 µs, the control unit determines that the change in the load status has occurred and switches the constant current control to the constant voltage control.

9. The lighting device of claim 1, wherein, when the measurement value of the current measuring unit is changed by 0.12 A or more within 300 µs, the control unit determines that the change in the load status has occurred and switches the constant current control to the constant voltage control.

10. The lighting device of claim 1, wherein the control unit switches the power converting unit in a boundary conduction mode and determines the change in the load status depending on the change of a switching frequency of the power converting unit.

11. The lighting device of claim 1, wherein the control unit stops the operation of the power converting unit for a time period during which the measurement value of the voltage measuring unit is kept greater than the voltage designated value under the constant voltage control.

12. The lighting device of claim 1, wherein a power consumption circuit is connected between output terminals of the power converting unit and when the constant current control is switched to the constant voltage control, the power consumption circuit partially consumes an output of the power converting unit.

13. The lighting device of claim 1, wherein the control unit switches the power converting unit in a boundary conduction mode and prolongs the switching-off time of the power converting unit when the constant current control is switched to the constant voltage control.

14. The lighting device of claim 1, wherein the control unit has an operation stop function by which the operation of the power converting unit is stopped when the constant voltage control lasts for a specific stop time or more after the constant current control is switched to the constant voltage control.

15. The lighting device of claim 1, wherein the loads include a plurality of serially-connected semiconductor light sources and the control unit further includes a bypass unit for short-circuiting the semiconductor light sources forming some of the loads and a load changeover unit for changing over the bypass unit between a connection state and a disconnection state.

16. The lighting device of claim 15, wherein the voltage designated value is a value obtained by adding a specific additional value to the measurement value of the voltage measuring unit available before the control unit determines that the change in the load status has occurred, the additional value being equal to or greater than a forward voltage of the semiconductor light sources short-circuited by the bypass unit.

17. A headlight device comprising the lighting device of claim 1.

18. The headlight device of claim 17, wherein the loads include at least two of crossing headlights, running headlights, width indicator lamps, daytime running lights, winker lamps and curve lights.

19. A motor vehicle equipped with the lighting device of claim 1.

20. A motor vehicle equipped with the headlight device of claim 17.

* * * * *